United States Patent
McDysan

(10) Patent No.: US 9,160,797 B2
(45) Date of Patent: Oct. 13, 2015

(54) NETWORK DEVICES WITH FEATURE PEER NETWORK LOGIC

(71) Applicant: Verizon Patent and Licensing Inc., Basking Ridge, NJ (US)

(72) Inventor: David E. McDysan, Great Falls, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 316 days.

(21) Appl. No.: 13/653,932

(22) Filed: Oct. 17, 2012

(65) Prior Publication Data

US 2014/0105216 A1   Apr. 17, 2014

(51) Int. Cl.
*H04L 29/08* (2006.01)
*H04L 12/58* (2006.01)
*H04L 12/725* (2013.01)
*H04L 12/721* (2013.01)

(52) U.S. Cl.
CPC ............ *H04L 67/1095* (2013.01); *H04L 67/04* (2013.01); *H04L 45/306* (2013.01); *H04L 45/38* (2013.01); *H04L 51/14* (2013.01)

(58) Field of Classification Search
CPC ..... H04L 12/56; H04L 67/04; H04L 67/1095; H04L 45/306; H04L 45/38; H04L 45/34; H04L 51/14; H04L 67/104
USPC .................................. 370/400, 392
See application file for complete search history.

(56) References Cited

U.S. PATENT DOCUMENTS

| | | | |
|---|---|---|---|
| 7,013,303 B2 * | 3/2006 | Faybishenko et al. | 1/1 |
| 7,203,190 B1 * | 4/2007 | Ruban et al. | 370/356 |
| 2003/0236896 A1 * | 12/2003 | Isomaki et al. | 709/229 |
| 2004/0078469 A1 * | 4/2004 | Ishwar et al. | 709/227 |
| 2006/0101159 A1 * | 5/2006 | Yeh et al. | 709/246 |
| 2009/0238084 A1 * | 9/2009 | Nadeau et al. | 370/248 |
| 2010/0046523 A1 * | 2/2010 | Mekkattuparamban et al. | 370/395.31 |
| 2010/0309906 A1 * | 12/2010 | Ramachandran et al. | 370/352 |
| 2011/0158237 A1 * | 6/2011 | McDysan et al. | 370/392 |
| 2011/0161416 A1 * | 6/2011 | McDysan et al. | 709/204 |
| 2011/0161521 A1 * | 6/2011 | McDysan et al. | 709/246 |
| 2012/0047210 A1 * | 2/2012 | McDysan et al. | 709/204 |

FOREIGN PATENT DOCUMENTS

WO    WO 0237772 A1 *  5/2002  .............. H04L 12/56

OTHER PUBLICATIONS

J. Kempf et al., "The Rise of the Middle and the Future of End-to-End: Reflections on the Evolution of the Internet Architecture", Network Working Group, IAB, Mar. 2004, 14 pages.

\* cited by examiner

*Primary Examiner* — Un C Cho
*Assistant Examiner* — Shah Rahman

(57) ABSTRACT

A device receives a service graph of feature peers for a packet of an application flow. The feature peers are associated with a network and the service graph includes an ordered set of the feature peers and forwarding requirements for the ordered set of the feature peers. The device generates forwarding instructions based on the service graph. The forwarding instructions include instructions to forward the packet to the ordered set of feature peers. The device provides the forwarding instructions to network devices of the network. The network devices forward the packet of the application flow to the ordered set of feature peers based on the forwarding instructions.

20 Claims, 18 Drawing Sheets

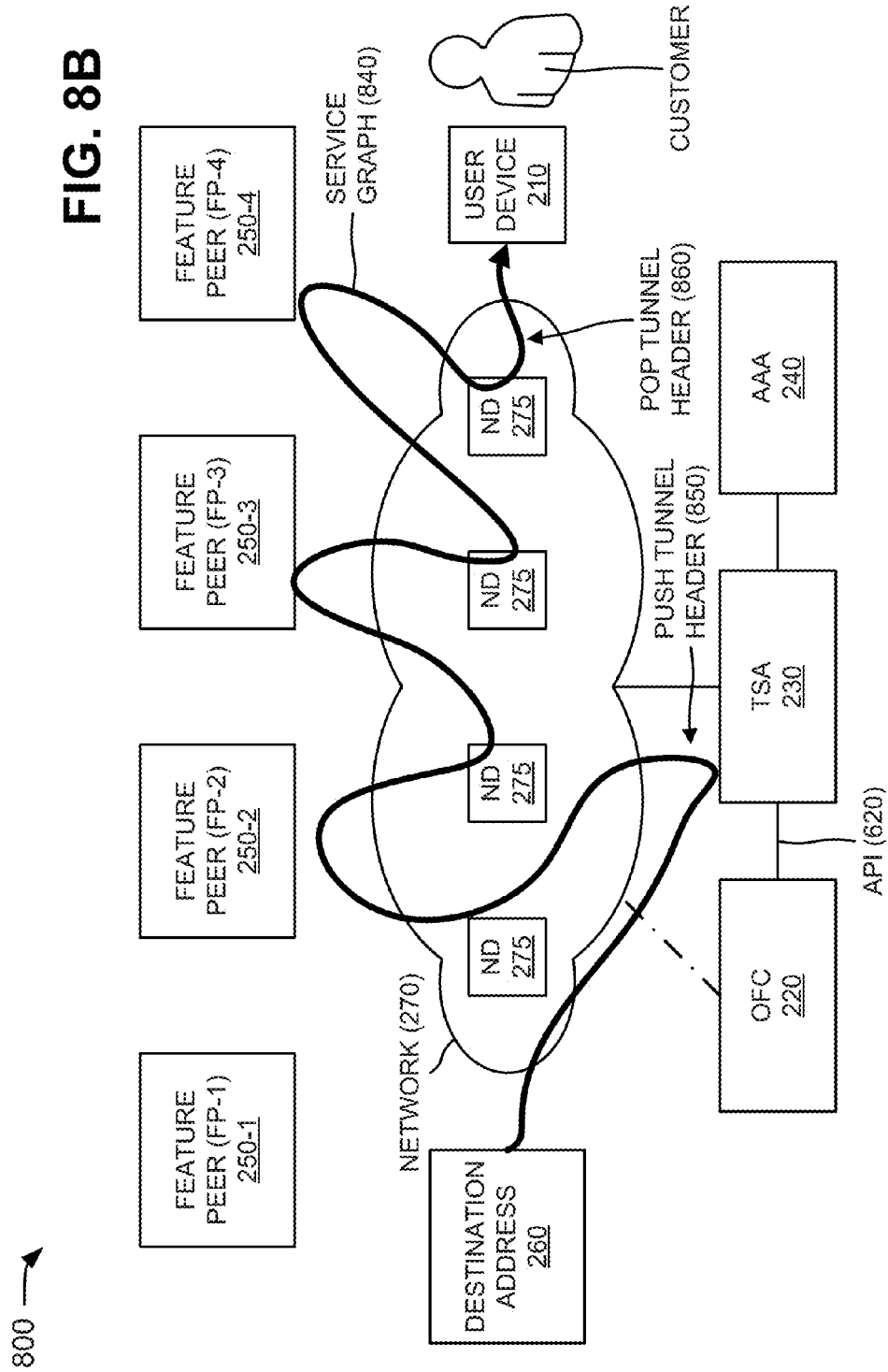

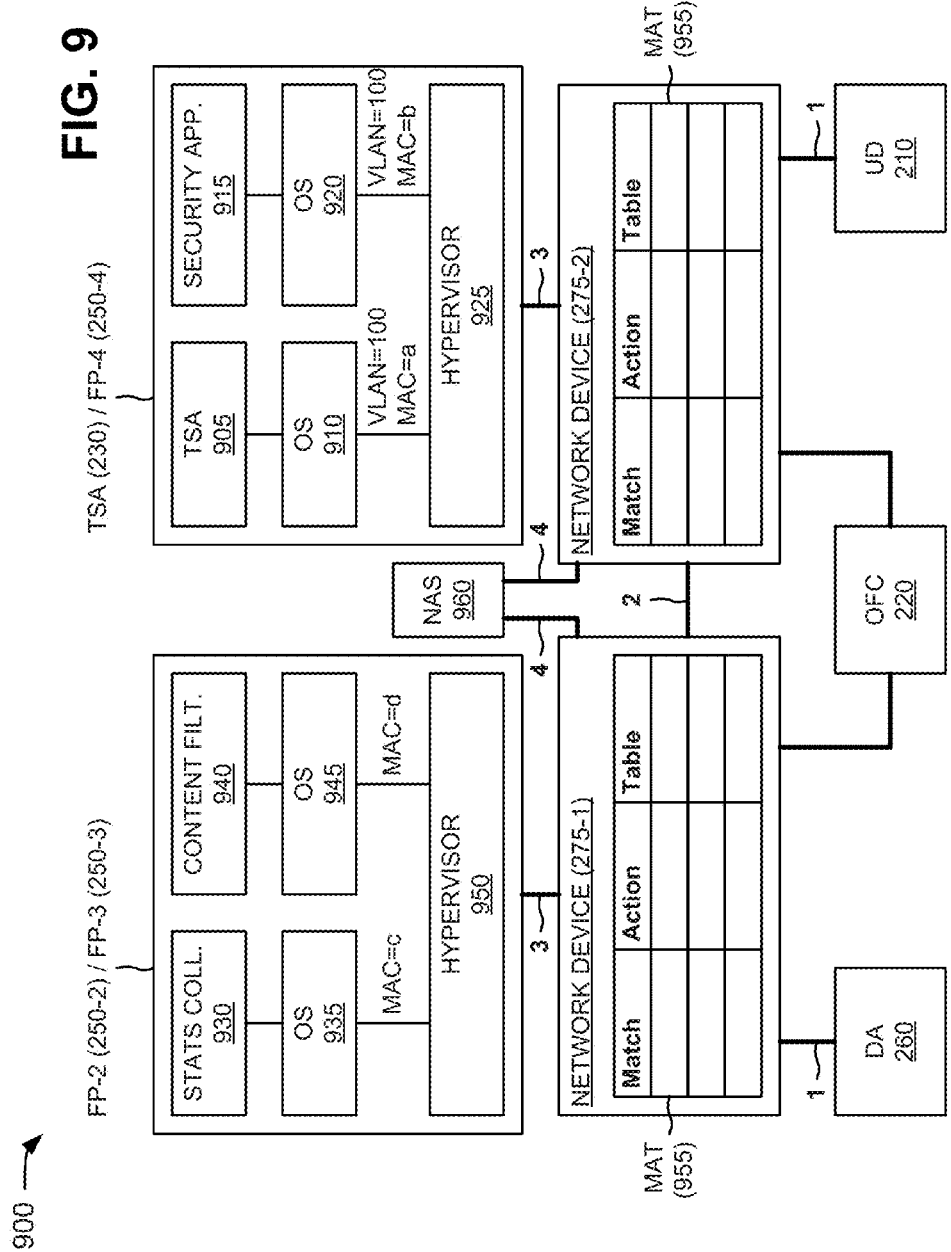

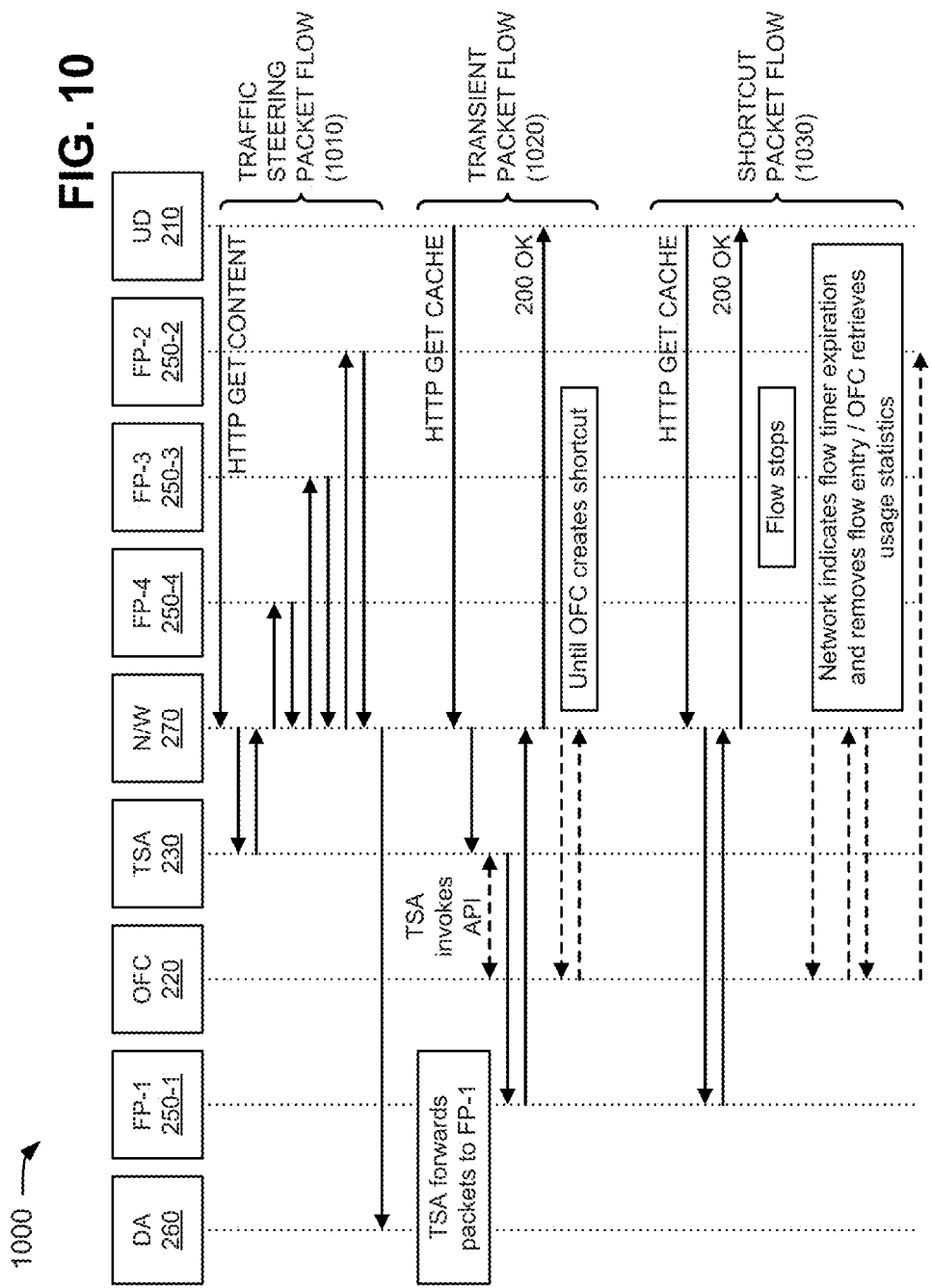

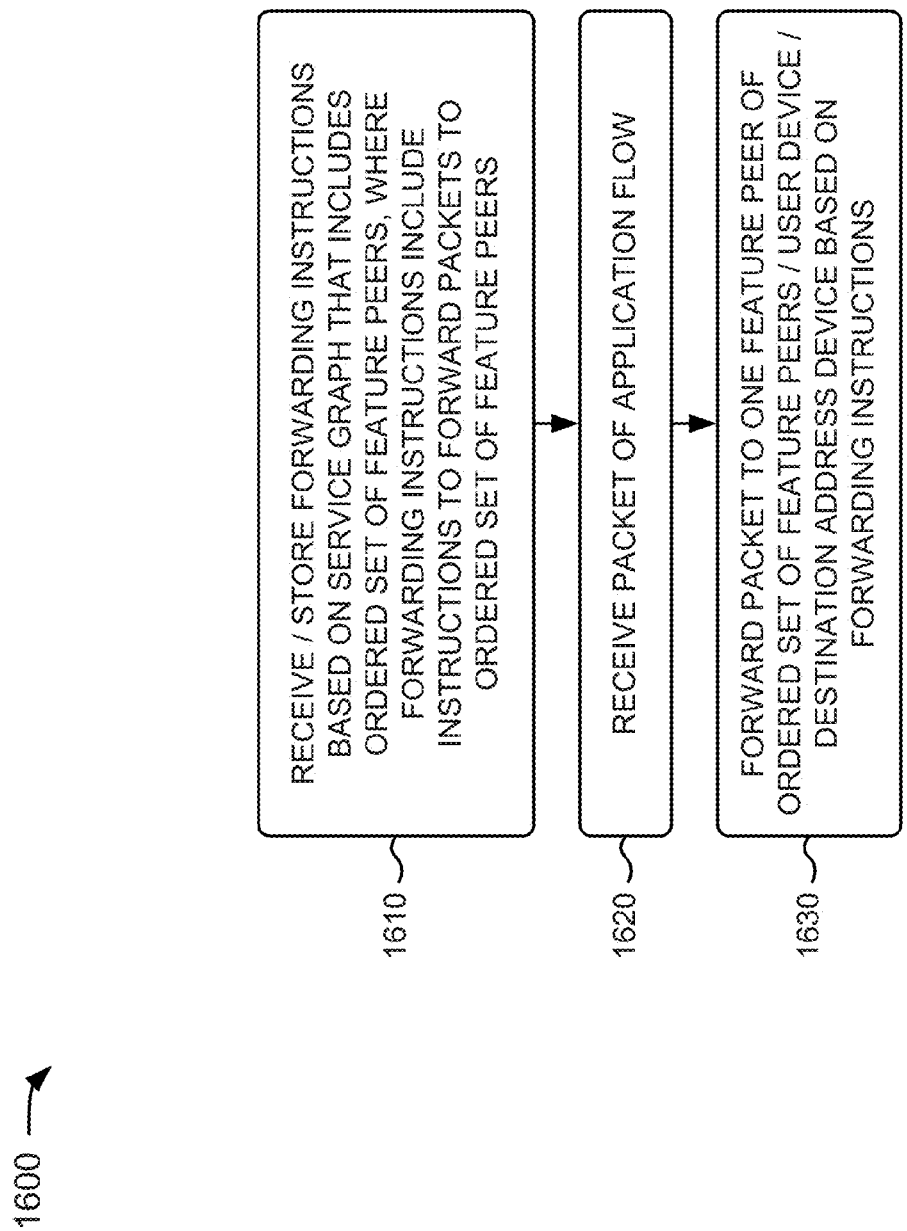

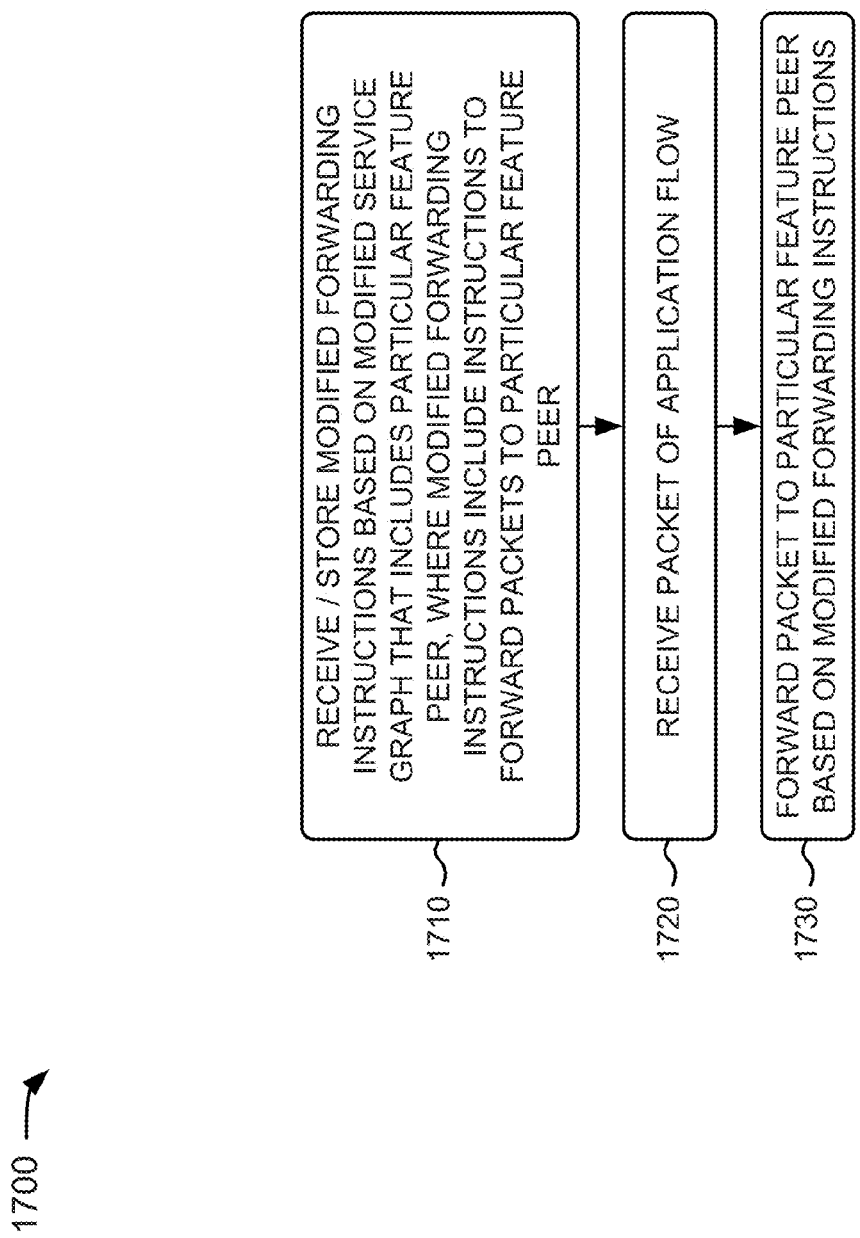

NETWORK DEVICES WITH FEATURE PEER NETWORK LOGIC

BACKGROUND

Initially, a structure of services and/or features offered over networks (e.g., telecommunications networks, the Internet, etc.) was directly between real computing and/or storage hosts, in what is commonly called the edge-to-edge principle. The services/features were usually client-server, server-server, or client-client oriented.

Intermediate network nodes, provided in such networks, operated only at the Internet layer (e.g., routers) or the link layer (e.g., Ethernet switches) using either routing or bridging protocols. Some of these networking protocols were augmented to implement various forms of virtualization, such as virtual circuits and multiple access virtual private networks. These forms of network virtualization were achieved by adding header fields to packets, such as Internet protocol (IP) tunnel headers, multiprotocol label switching (MPLS) label stack headers, and/or extended Ethernet fields (e.g., virtual local area network (VLAN) tags), in conjunction with augmenting the routing and signaling protocols to distribute this information. This resulted in multiple logically separate, or virtual, networks, often referred to as Virtual Private Networks (VPNs).

Services/features provided by networking and computing resources are often implemented as overlays on networks (e.g., the Internet and/or VPNs). Furthermore, an enrichment of services has occurred, with the rise of middle-boxes, or feature peers, which operate above the Internet layer at the transport and/or application layers. The feature peers may include gateways provided between VPNs and the Internet, network address translation (NAT) devices, firewalls, intrusion detection devices, proxies of various forms, content filtering devices, caches, web acceleration devices, multimedia transcoding and statistics collection devices, etc. The feature peers, as part of service structures (i.e., feature networks), deviate from the original edge-to-edge principle, and require adherence to a different set of guiding principles to implement a reliable, traffic-engineered system that will achieve the goal of a converged service infrastructure.

Some networks provide packet and/or application flow services and/or features via one or more feature peers (i.e., middle boxes that communicate amongst themselves and not necessarily with a client or server). Examples of such packet/application flow services/features include content-related services (e.g., voice, audio, and/or video transcoding; multimedia conference bridging; replication; content filtering; content recognition; etc.); security-related services (e.g., network-based firewalls and/or application layer gateways; intrusion detection, prevention, and/or mitigation; denial of service detection, prevention, and/or mitigation; etc.); flow, rate, and quality of service (QoS)-related services (e.g., metering; policing; shaping; scheduling; coordination with higher-level signaling, policy, and configuration; caching; etc.); statistics collection and accounting-related services (e.g., usage cap metering, notification, and/or enforcement; billing; etc.); administrative-related services (e.g., selective packet set capture, replication, redirection, and/or blocking; packet inspection; etc.); proxy-related services where a feature peer acts on behalf of a client and/or server which is either (temporarily) off the network and/or in a failure/recovery state; etc.

Such packet/application flow services/features may be managed via a "star" or "flower" network centered on a feature switch. In the star/flower arrangement, traffic to/from a customer (e.g., of a service or feature) is directed into a set of feature peers by the feature switch. Such an arrangement may require configuration of the feature switch, use/configuration of tunnels, and configuration of load balancing, and may result in sub-optimal performance. The star/flower arrangement is expensive because, the feature switch (e.g., an access router, a load balancer, a tunnel gateway, or a traffic steering application (TSA) executing on a server), the routers and switches are traversed twice between each feature peer and the feature switch that connects to a customer and/or a router on the edge of a data center connected to the Internet and/or a virtual private network (VPN). In the star/flower arrangement, there needs to be a tunnel for each feature peer since a tunnel identification (ID) determines a next feature peer or an exit to a data network. Furthermore, the star/flower arrangement can increase latency if the feature peers are not near the feature switch that connects to the customer and the feature switch that connects to the feature peers. The star/flower arrangement requires a static configuration, in the feature switch, of tunnel IDs and next hops, and is resilient only if a dedicated replica of the feature peers is provisioned. If a dedicated replica of the feature peers is not provisioned, then reconfiguration is needed in response to failures (e.g., load balancing across the feature peers requires reconfiguration), and it is difficult to represent more complex feature topologies than a chain feature topology or is complex to implement dynamic feature networks, also referred to as service graphs.

Packet/application flow services/features may also be managed via a service header-based routing arrangement. In one example service header-based routing arrangement, a feature switch registers with a service broker, and the service broker provisions a table (e.g., of the feature switch) to map customer packets to a service routing function (e.g., associated with the feature switch). The service broker provisions service nodes with service header, tunnel, network, and subscriber information consistent with provisioning of the service routing function for the feature switch and/or edge router that connects to a destination of a customer in the network. The feature switch or edge router determines data network information, and receives a packet from a customer (e.g., from a device associated with the customer) or from the Internet/VPN. The access/edge router uses the table to determine that the packet includes subscribed to services and directs the packet to the service routing function. The service routing function uses local configuration and packet information to determine a service header to be inserted, encapsulates this within a tunnel header, and forwards the packet to a first service node over the tunnel. The service node decapsulates the packet from the tunnel, reviews the service header and configured information from the service broker to determine an outgoing tunnel, and forwards the packet to the next service node. Eventually, the packet returns to the access/edge router that originally received the packet. The service routing function decapsulates the packet from the tunnel, examines the service header, and determines that the next step is forwarding. The access/edge router then forwards the packet, via the data network, toward a destination address.

The service header-based routing arrangement requires expensive changes to the software and/or hardware of the access/edge router in order to implement the service header insertion and processing and to make it behave as a feature switch. The service header-based routing arrangement relies on a centralized service broker to determine, download, and monitor state, and to optimize and load balance service node level routing across a set of service nodes. Centralization may limit a convergence time and responsiveness to change associated with the arrangement. Furthermore, the service header-based routing arrangement requires fault detection and restoration performance to be determined by the centralized service broker, and may not be implemented across more than one service provider.

BRIEF DESCRIPTION OF THE DRAWINGS

FIGS. 8A and 8B are diagrams of example service chain tunneling operations capable of being performed by the environment of FIG. 2;

FIG. 9 is a diagram of example components of an example portion of the environment depicted in FIG. 2;

FIG. 10 is a flow diagram of example packet flows through an example portion of the environment depicted in FIG. 2;

FIG. 16 is a flow chart of an example process for implementing feature peer network forwarding instructions; and FIG. 17 is a flow chart of an example process for implementing modified feature peer network forwarding instructions.

DETAILED DESCRIPTION OF PREFERRED EMBODIMENTS

The following detailed description refers to the accompanying drawings. The same reference numbers in different drawings may identify the same or similar elements.

Systems and/or methods described herein may enable forwarding of packets of an application flow (e.g., traffic) between an ordered set of feature peers (e.g., the ordered set being referred to herein as a "service graph" and/or a "feature network") in a more efficient manner than traditional load balancer, feature switch, and/or traffic steering application methods. The systems and/or methods may determine the service graph of feature peers based on inspection of the packets, and may utilize a protocol (e.g., the Openflow protocol or other similar protocols) to configure network devices of a network with the service graph. The network devices may forward the packets of the application flow to the feature peers, based on the service graph and without changing the application flow. The systems and/or methods may dynamically change the service graph for particular application flows (e.g., long lasting, high bandwidth application flows) to achieve even greater efficiencies for the particular application flows, implement changes in the service(s) provided, and/or add/remove feature peers from the service graph.

Figure 1:
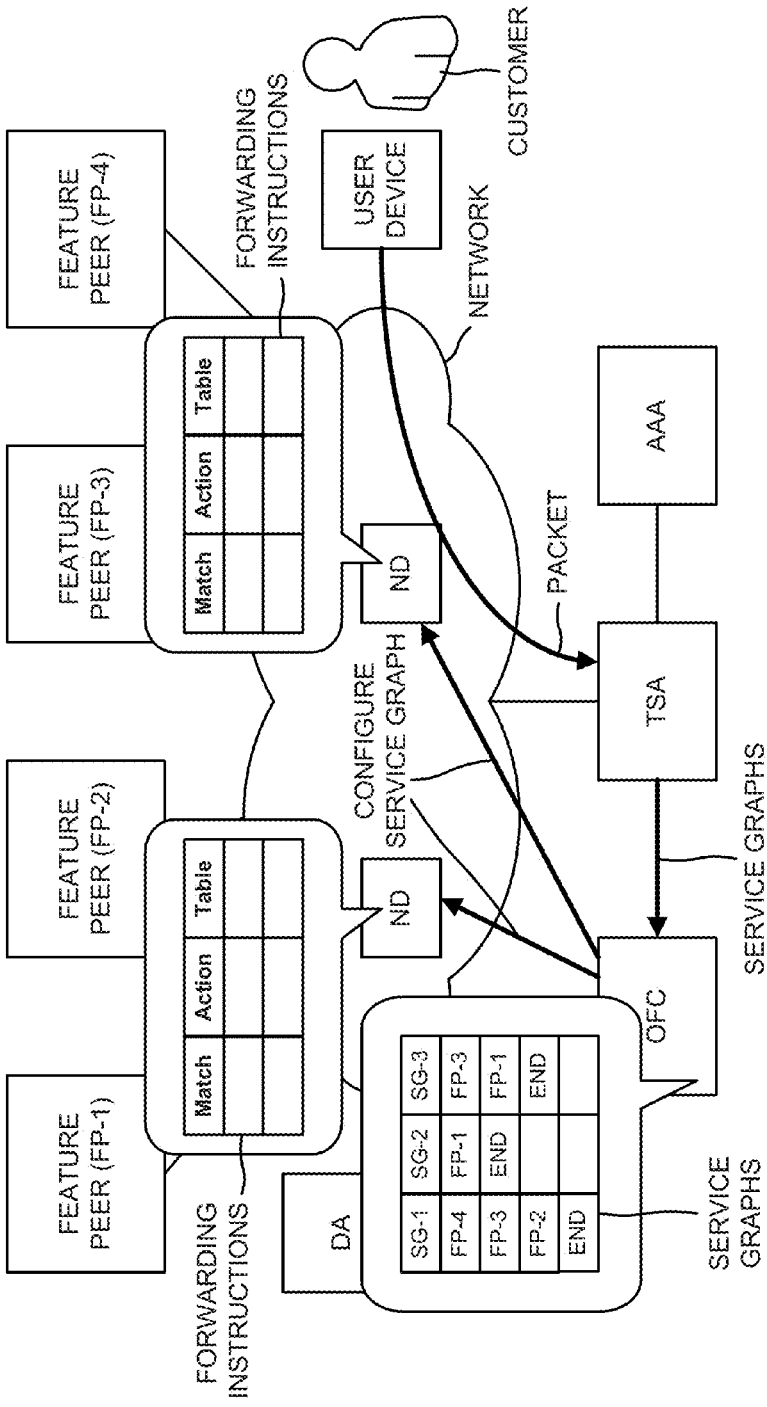
FIG. 1 is a diagram of an overview of an example implementation described herein.

FIG. 1 is a diagram of an overview of an example implementation described herein. As shown, a user device, an openflow controller (OFC), a traffic steering application (TSA), an authentication, authorization, and accounting (AAA) device, four feature peers (FP-1 through FP-4), and a destination address (DA) device (e.g., for connection to the Internet or a VPN) may be connected via a network with network devices (NDs).

The user device may include a radiotelephone, a personal communications system (PCS) terminal, a smart phone, a personal digital assistant (PDA), a laptop computer, a tablet computer, a personal computer, etc. The OFC may include one or more computation and communication devices that utilize a protocol (e.g., the Openflow protocol or other similar protocols) to configure the network devices with service graphs. The TSA may include one or more computation and communication devices that generate service graphs for directing packets through an ordered set of feature peers. The AAA device may include one or more computation and communication devices that provide functionality to support authentication, authorization, and accounting functions that determine user-related information (e.g., device characteristics, identity of the user, profiles associated with the user, current state of the user's services, etc.).

Each of the feature peers may include one or more computation and communication devices that provide packet/application flow services/features, such as content-related services, security-related services, flow, rate, and QoS-related services, statistics collection and accounting-related services, administrative-related services, etc. For example, a first feature peer (FP-1) may provide cache-related services, a second feature peer (FP-2) may provide statistics collection-related services, a third feature peer (FP-3) may provide content filtering-related services, and a fourth feature peer (FP-4) may provide security-related services.

The destination address device may include a computation and communication device that is a destination of packets provided by the user device. In one example, the destination address device may be provided in the Internet or a VPN. The network may include a local area network (LAN), a wide area network (WAN), a metropolitan area network (MAN), a telephone network, such as the Public Switched Telephone Network (PSTN), an intranet, a packet-switched network, or a combination of networks. The network device may include one or more traffic transfer devices, such as a gateway, a router, a switch, a firewall, a network interface card (NIC), a hub, a bridge, a proxy server, an optical add-drop multiplexer (OADM), or some other type of device that processes and/or transfers traffic.

As further shown in FIG. 1, a customer, associated with the user device, may wish to provide a packet of an application flow to the destination address device for delivery to, for example, a network (e.g., the Internet, a VPN, etc.). A packet returned by the destination address device, and destined for the customer, may be processed in a similar manner in a reverse direction for the service graph, which may differ from the forward direction. In one example, the packet may need to traverse one or more of the feature peers before being provided to the destination address device. The TSA may consult with the AAA and/or may inspect the packet of the application flow to determine one or more service graphs for the packet of the application flow. The TSA may provide the service graphs to the OFC, and the OFC may receive and store the service graphs.

In one example, a first service graph (SG-1) may cause the packet to traverse the fourth feature peer, the third feature peer, and the second feature peer before being provided to the destination address device. A second service graph (SG-2) may cause the packet to be provided to only the first feature peer. A third service graph (SG-3) may cause the packet to traverse the third feature peer and the first feature peer before being provided to the destination address device.

In one example implementation, the OFC may configure the network devices in the network to implement the first service graph. For example, the OFC may provide first forwarding instructions to the network devices, where the first forwarding instructions may instruct the network devices to implement the first service graph. Based on the first forwarding instructions, the network devices may forward the packet of the application flow to the fourth feature peer, the third feature peer, the second feature peer, and finally to the destination address device. The set of feature peers and/or the order in which the feature peers are traversed may be different for a packet traversing from the customer to the destination address device than a packet traversing from the destination address device to the customer.

Alternatively, or additionally, the OFC may configure the network devices in the network to implement the second service graph. For example, the OFC may provide second forwarding instructions to the network devices, where the second forwarding instructions may instruct the network devices to implement the second service graph. Based on the second forwarding instructions, the network devices may forward the packet of the application flow to the first feature peer.

Alternatively, or additionally, the OFC may configure the network devices in the network to implement the third service graph. For example, the OFC may provide third forwarding instructions to the network devices, where the third forwarding instructions may instruct the network devices to implement the third service graph. Based on the third forwarding instructions, the network devices may forward the packet of the application flow to the third feature peer, the first feature peer, and finally to the destination address device. The TSA may instruct the OFC to connect multiple service graphs together on behalf of communications between customers and destination address devices. This may include the case of inter-customer communication, such as peer-to-peer communication, peer-to-peer streaming, network-based caching on behalf of peers, etc. It may also include the case where more complex service graphs are composed from ordered sets of simpler service graphs.

The term "application flow," as used herein, is to be broadly construed to include a traffic flow of one or more packets. The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
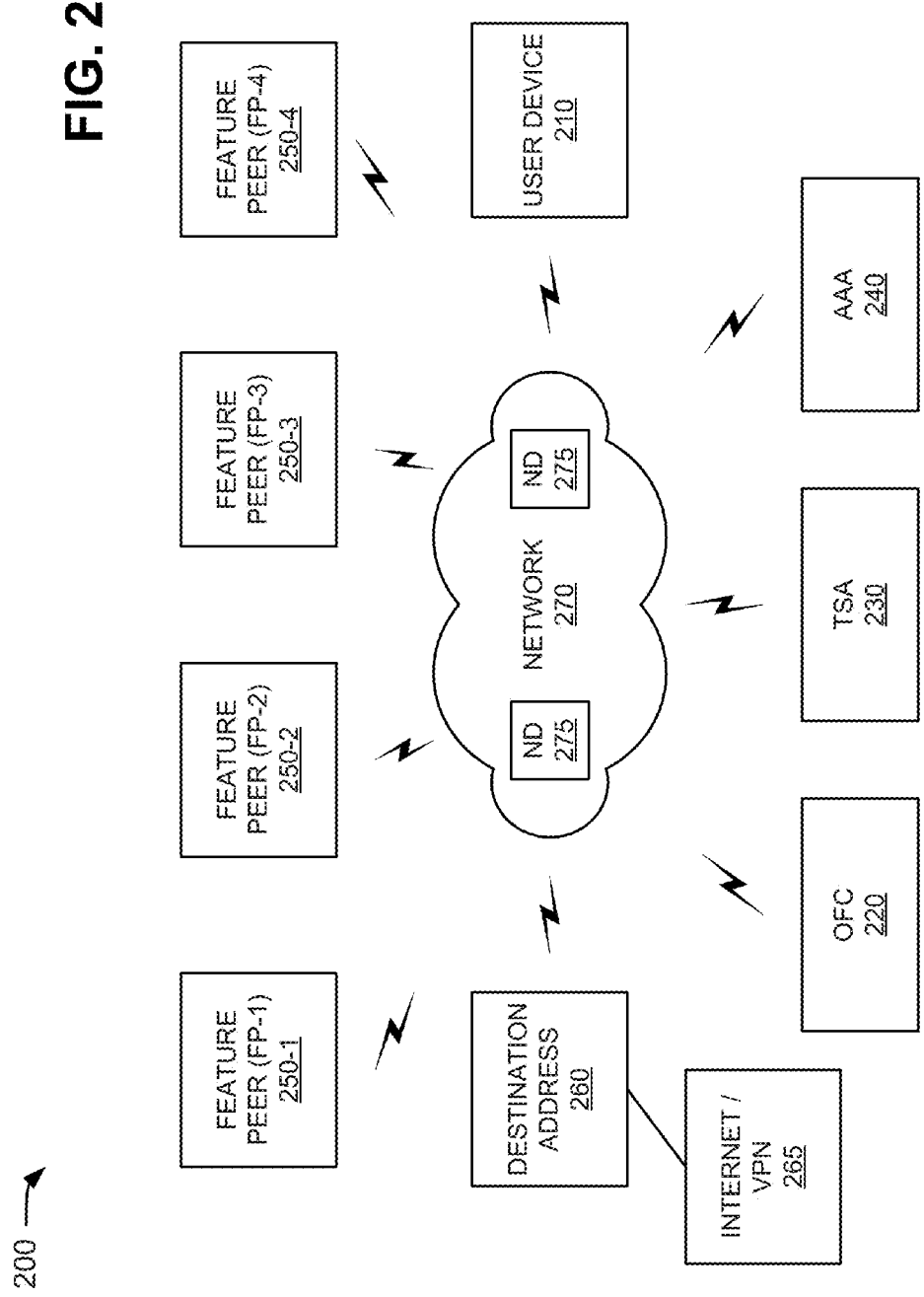
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, an OFC 220, a TSA 230, an AAA device 240 (referred to herein as "AAA 240"), feature peers 250-1 through 250-4 (collectively referred to herein as "feature peers 250," and, in some instances, singularly as feature peer 250), a destination address device 260, a network 270, and network devices 275. Devices of environment 200 may interconnect via wired and/or wireless connections or links. A single user device 210, a single OFC 220, a single TSA 230, a single AAA 240, four feature peers 250, a single destination address device 260, an Internet/VPN 265, a single network 270, and two network devices 275 have been illustrated in FIG. 2 for simplicity. In practice, there may be more user devices 210, OFCs 220, TSAs 230, AAAs 240, feature peers 250, destination address devices 260, Internet/VPNs 265, networks 270, and/or network devices 275.

User device 210 may include a radiotelephone, a PCS terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer, a tablet computer, a personal computer, a landline telephone, or other types of computation and communication devices. In an example implementation, user device 210 may include a device that is capable of accessing features and/or services (e.g., content-related services; security-related services; flow, rate, and QoS-related services; accounting-related services; administrative-related services; etc.) provided by other components of environment 200.

OFC 220 may include one or more server devices, or other types of computation and communication devices, that gather, process, search, and/or provide information in a manner described herein. In one example implementation, OFC 220 may configure network devices 275 with service graphs (or feature peer networks) using a protocol, such as the Openflow protocol or other similar protocols. Each service graph may include instructions for forwarding packets to an ordered set of feature peers 250.

TSA 230 may include one or more server devices, or other types of computation and communication devices, that gather, process, search, and/or provide information in a manner described herein. In one example implementation, TSA 230 may monitor packets of an application flow and/or may consult information in AAA 240 to determine user-related information and service graphs for the packets. TSA 230 may provide the determined service graphs to OFC 220 for provisioning network devices 275 with the service graphs. In one example, the functions of OFC 220 and TSA 230, described herein, may be combined in a single device or distributed among several devices. Alternatively, or additionally, the functions of TSA 230, described herein, may be performed by OFC 220.

AAA 240 may include one or more server devices, or other types of computation and communication devices, that gather, process, search, and/or provide information in a manner described herein. In an example implementation, AAA 240 may provide functionality to support authentication, authorization, and accounting functions that can be employed to control access to user-related information. With regard to the authentication function, AAA 240 may verify a device's (e.g., user device's 210) specific digital identity provided via an identifier (e.g., a password, a digital certificate, a phone number, a user profile, customer subscription options, customer preferences, etc.) associated with the device or a set of devices (e.g., owned by a customer or a group of customers). With regard to the authorization function, AAA 240 may grant or refuse privileges to a device for accessing specific services (e.g., IP address filtering, address assignment, route assignment, QoS, etc.), usage of particular service graphs, and access to user-related information. With regard to the accounting function, AAA 240 may track consumption of network resources by customers (e.g., by user device 210) and may use this information for management, planning, billing, etc.

Feature peer 250 may include one or more server devices, or other types of computation and communication devices, that gather, process, search, and/or provide information in a manner described herein. In an example implementation, feature peer 250 may provide packet/application flow services/features, such as content-related services, security-related services, flow, rate, and QoS-related services, statistics collection and accounting-related services, administrative-related services, etc., as described above. For example, the first feature peer 250-1 may provide cache-related services, the second feature peer 250-2 may provide statistics collection-related services, the third feature peer 250-3 may provide content filtering-related services, and the fourth feature peer 250-4 may provide security-related services. Feature peers 250 may also communicate with each other using additional packets.

Destination address device 260 may include one or more server devices, or other types of computation and communication devices, that gather, process, search, and/or provide information in a manner described herein. In an example implementation, destination address device 260 may include a device that is a destination of packets provided by user device 210. In one example, destination address device 260 may include a network device (e.g., a router, a switch, etc.), an application server, etc. provided in the Internet. As shown in FIG. 2, destination address device 260 may connect to a network 265, such as the Internet, a VPN, etc.

Network 270 may include a LAN, a WAN, a MAN, a telephone network, such as the Public Switched Telephone Network (PSTN), an intranet, a packet-switched network, an optical fiber (or fiber optic)-based network, a television network, or a combination of networks.

Network device 275 may include one or more traffic transfer devices, such as a gateway, a router, a switch, a firewall, a load balancer, a NIC, a hub, a bridge, a proxy server, an OADM, or some other type of device that processes and/or transfers traffic (e.g., packets of an application flow). In one example implementation, network devices 275 may be configured with a service graph by OFC 220, and may collect statistics for use by OFC 220. The service graph may include instructions that cause network devices 275 to forward packets in a particular manner through environment 200. For example, the service graph may include instructions that cause network devices 275 to forward packets from user device 210 to the fourth feature peer 250-4, the third feature peer 250-3, the second feature peer 250-2, and finally to destination address device 260. The instructions may affect multiple related flows or a single flow. Instructions that affect multiple related flows may make environment 200 more scalable in parts that process a large aggregate of flows. Instructions that process individual or small sets of flows may be processed by user device 210, destination address device 260, and/or network devices 275 capable of supporting a larger number of individual flows.

Although FIG. 2 shows example devices of environment 200, in other implementations, environment 200 may include fewer devices, different devices, differently arranged devices, or additional devices than depicted in FIG. 2. Alternatively, or additionally, one or more devices of environment 200 may perform one or more tasks described as being performed by one or more other devices of environment 200.

Figure 3:
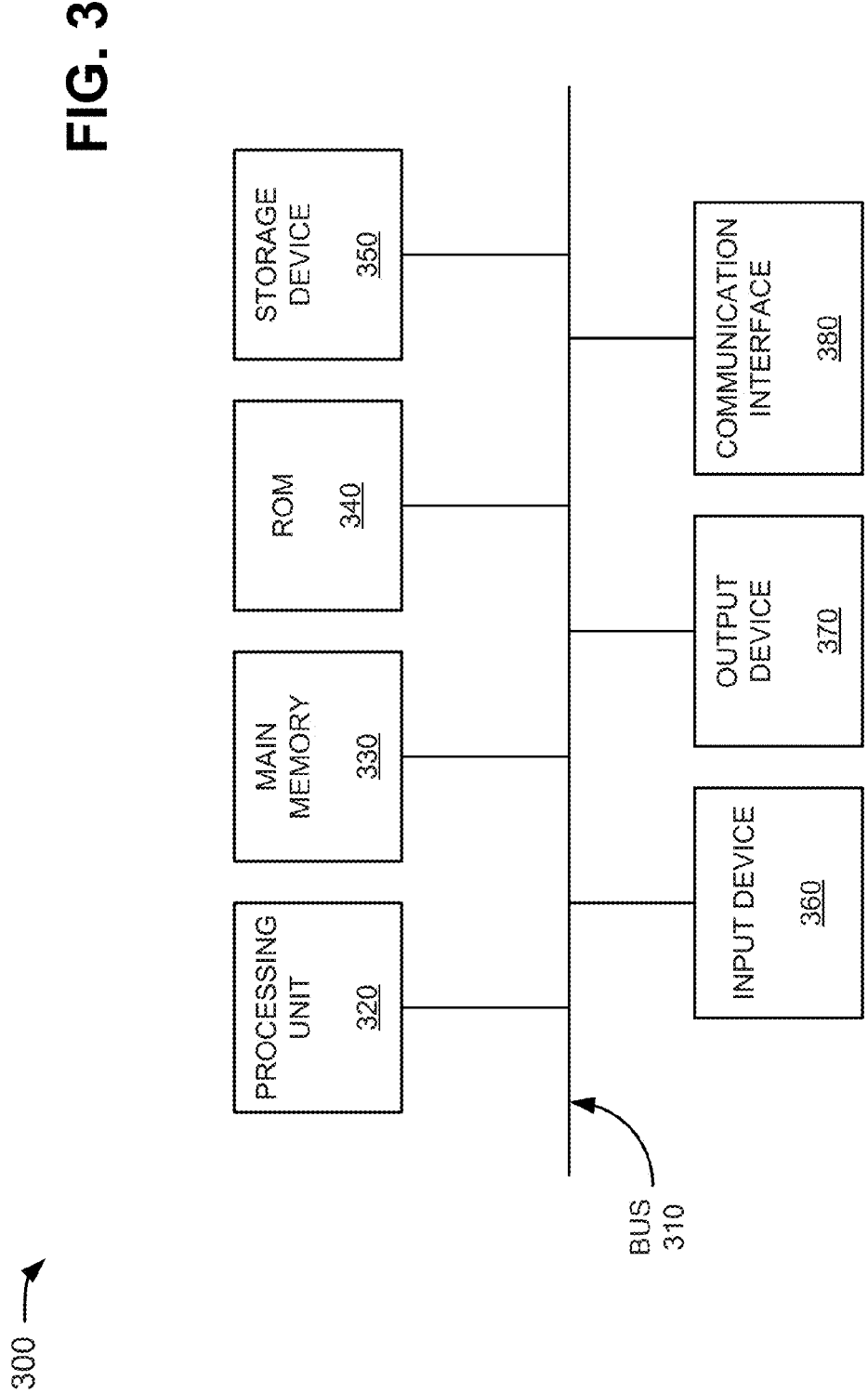
FIG. 3 is a diagram of example components of one or more devices of the environment depicted in FIG. 2.

FIG. 3 is a diagram of example components of a device 300 that may correspond to one or more devices of environment 200. In one example implementation, one or more of the devices of environment 200 may include one or more devices 300 or one or more components of device 300. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive. In one example implementation, processing unit 320, main memory 330, ROM 340, and/or storage device 350 may be dedicated hardware and/or may be implemented as virtual instances via a virtual machine manager (VMM) (e.g., a hypervisor).

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, and/or may be capable of performing switching functions (e.g., under the control of OFC 220). Switching functions of communication interface 380 may be dedicated hardware, virtually provided by a VMM, implemented in a guest operating system, and/or implemented in applications.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
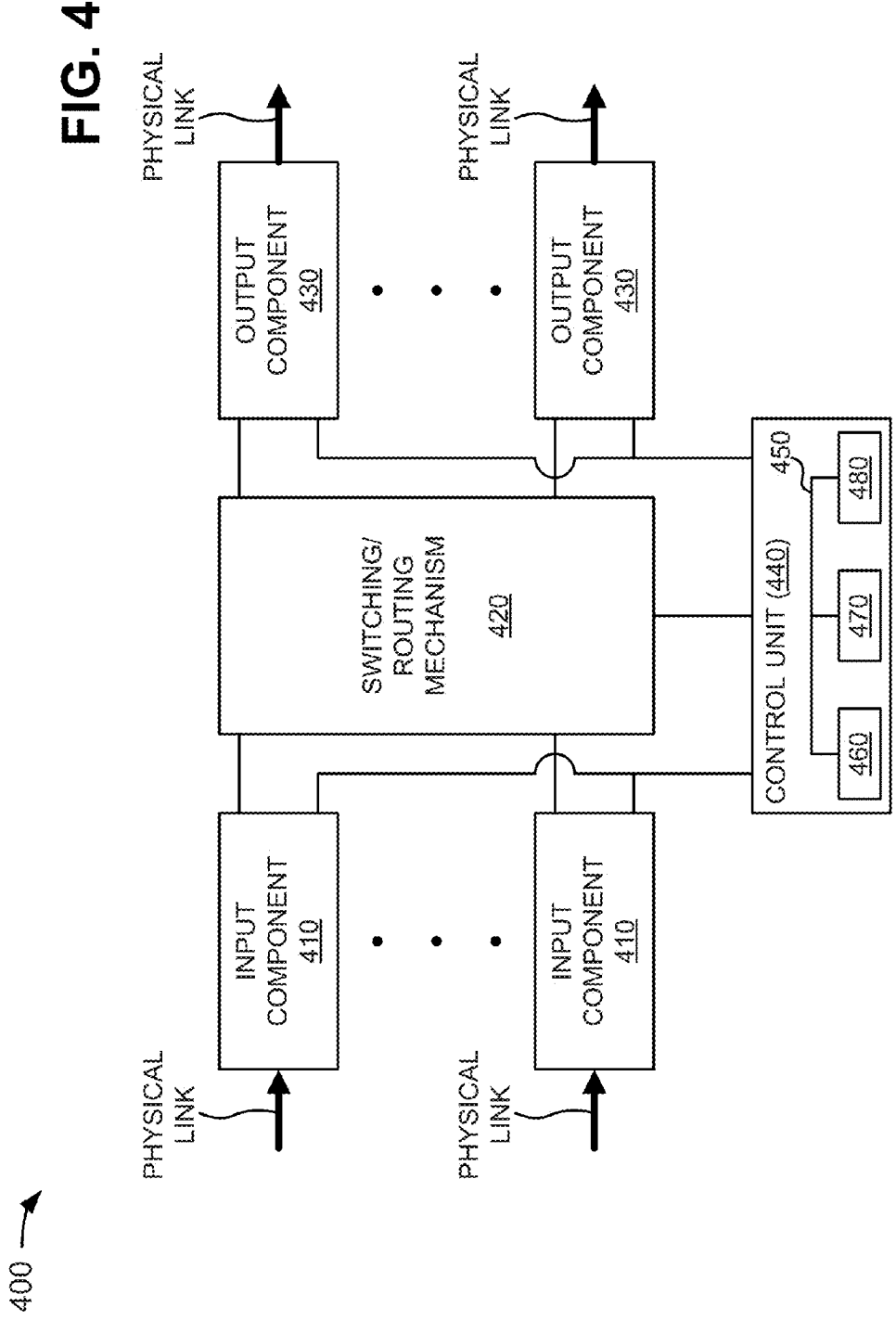
FIG. 4 is a diagram of example components of a network device of FIG. 2.

FIG. 4 is a diagram of example components of a device 400 that may correspond to network device 275 (FIG. 2). In one example implementation, network device 275 may include one or more devices 400 or one or more components of device 400. As shown in FIG. 4, device 400 may include input components 410, a switching/routing mechanism 420, output components 430, and a control unit 440.

Input components 410 may be a point of attachment for physical links and may be a point of entry for incoming traffic, such as packets. Input components 410 may process incoming traffic, such as by performing data link layer encapsulation or decapsulation, matching on specific sets of packet header fields, taking certain actions, implementing a table of functions, etc. In an example implementation, input components 410 may send and/or receive packets.

Switching/routing mechanism 420 may interconnect input components 410 with output components 430. Switching/routing mechanism 420 may be implemented using many different techniques. For example, switching/routing mechanism 420 may be implemented via busses, via crossbars, and/or with shared memories. The shared memories may act as temporary buffers to store traffic from input components 410 before the traffic is eventually scheduled for delivery to output components 430.

Output components 430 may store packets and may schedule packets for service on output physical links. Output components 430 may include scheduling algorithms that support priorities and guarantees. Output components 430 may support data link layer encapsulation and decapsulation, and/or a variety of higher-level protocols. In an example implementation, output components 430 may send packets, receive packets, match on specific sets of packet header fields, take certain actions, implement a table of functions, etc.

Control unit 440 may use routing protocols and one or more forwarding tables for forwarding packets. Control unit 440 may connect with input components 410, switching/routing mechanism 420, and output components 430. Control unit 440 may compute a forwarding table, implement routing protocols, and/or run software to configure and manage device 400. Control unit 440 may determine routing for any packet whose destination address may not be found in the forwarding table.

In an example implementation, control unit 440 may include a bus 450 that may include a path that permits communication among a processor 460, a memory 470, and a communication interface 480 (e.g., for communication with OFC 220). Processor 460 may include one or more processors, microprocessors, ASICs, FPGAs, or other types of processing units that may interpret and execute instructions. Memory 470 may include a RAM, a ROM device, a magnetic and/or optical recording medium and its corresponding drive, and/or another type of static and/or dynamic storage device that may store information and instructions for execution by processor 460. Memory 470 may also temporarily store incoming traffic (e.g., a header of a packet, an entire packet, or a set of packets) from input components 410, for processing by processor 460, before a packet(s) is directed back to switching/routing mechanism 420, transported by switching/routing mechanism 420, and eventually scheduled to be sent to output components 430. Communication interface 480 may include any transceiver-like mechanism that enables control unit 440 to communicate with other devices and/or systems.

As described herein, device 400 may perform certain operations in response to processor 460 executing software instructions contained in a computer-readable medium, such as memory 470. The software instructions may be read into memory 470 from another computer-readable medium, such as a data storage device, or from another device via communication interface 480. The software instructions contained in memory 470 may cause processor 460 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
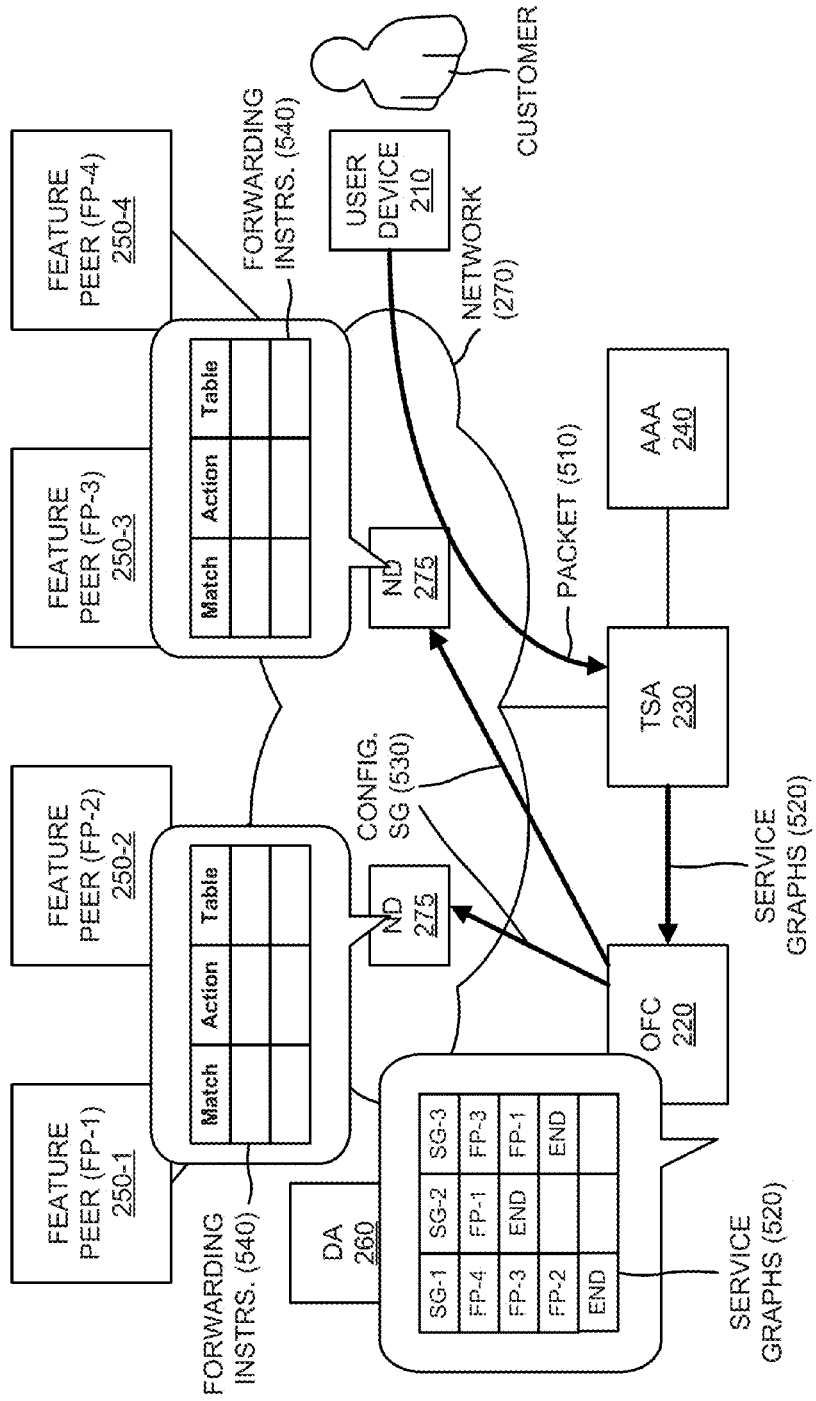
FIG. 5 is a diagram of example operations capable of being performed by the environment of FIG. 2.

FIG. 5 is a diagram of example operations 500 capable of being performed by environment 200 (FIG. 2). As shown in FIG. 5, environment 200 may include user device 210, OFC 220, TSA 230, AAA 240, feature peers 250, destination address device (DA) 260, network 270, and network devices (NDs) 275. User device 210, OFC 220, TSA 230, AAA 240, feature peers 250, destination address device 260, network 270, and network devices 275 may include the features described above in connection with one or more of, for example, FIGS. 1-4.

As further shown in FIG. 5, a customer, associated with user device 210, may wish to provide a packet 510 of an application flow to destination address device 260 or to another user device 210 (e.g., in peer-to-peer communication). In one example, packet 510 may need to traverse one or more feature peers 250 before being provided to destination address device 260 or another user device 210. TSA 230 may consult with AAA 240 and/or may inspect packet 510 of the application flow to determine one or more service graphs 520 for packet 510 of the application flow. TSA 230 may provide service graphs 520 to OFC 220, and OFC 220 may receive and store service graphs 520.

In one example, a first service graph (SG-1), of service graphs 520, may cause packet 510 to traverse the fourth feature peer 250-4, the third feature peer 250-3, and the second feature peer 250-2 before being provided to destination address device 260. A second service graph (SG-2), of service graphs 520, may cause packet 510 to be provided to the first feature peer 250-1 (e.g., a cache server). A third service graph (SG-3), of service graphs 520, may cause packet 510 to traverse the third feature peer 250-3 and the first feature peer 250-1 before being provided to destination address device 260.

In one example implementation, OFC 220 may configure network devices 275 in network 270 to implement the first service graph (SG-1), as indicated by reference number 530. For example. OFC 220 may generate and provide first forwarding instructions to network devices 275. The first forwarding instructions may include (and be stored in) a match action table (MAT) (e.g., as described below in connection with FIGS. 9 and 11-13) that instructs network devices 275 to implement the first service graph. Based on the first forwarding instructions, network devices 275 may forward packet 510 of the application flow to the fourth feature peer 250-4, the third feature peer 250-3, the second feature peer 250-2, and finally to destination address device 260.

Alternatively, or additionally, OFC 220 may configure network devices 275 to implement the second service graph (SG-2), as indicated by reference number 530. For example, OFC 220 may generate and provide second forwarding instructions to network devices 275. The second forwarding instructions may include (and be stored in) a MAT that instructs network devices 275 to implement the second service graph. Based on the second forwarding instructions, network devices 275 may forward packet 510 of the application flow to the first feature peer 250-1.

Alternatively, or additionally, OFC 220 may configure network devices 275 to implement the third service graph (SG-3). For example, OFC 220 may generate and provide third forwarding instructions to network devices 275, as indicated by reference number 530. The third forwarding instructions may include (and be stored in) a MAT that instructs network devices 275 to implement the third service graph. Based on the third forwarding instructions, network devices 275 may forward packet 510 of the application flow to the third feature peer 250-3, the first feature peer 250-1, and finally to destination address device 260.

Examples of service graphs and/or forwarding instructions that may be implemented by OFC 220 and/or network devices 275 are described and illustrated below in connection with FIGS. 6-13.

Although FIG. 5 shows example components of environment 200, in other implementations, environment 200 may include fewer components, different components, differently arranged components, or additional components than depicted in FIG. 5. Alternatively, or additionally, one or more components of environment 200 may perform one or more other tasks described as being performed by one or more other components of environment 200.

Figure 6:
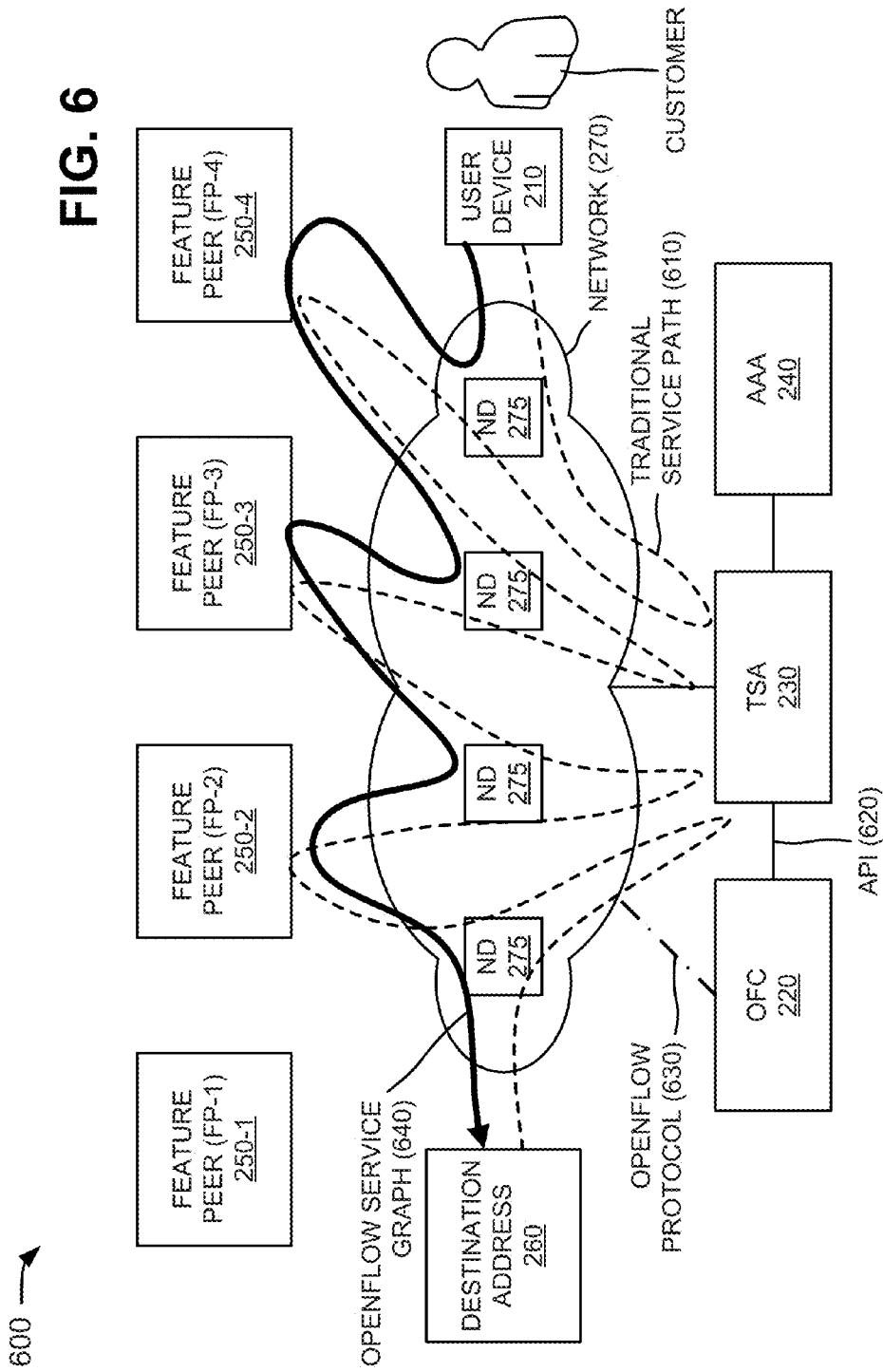
FIG. 6 is a diagram of example service chain operations capable of being performed by the environment illustrated in FIG. 2.

FIG. 6 is a diagram of example service chain operations 600 capable of being performed by environment 200 (FIG. 2). As shown in FIG. 6, environment 200 may include user device 210, OFC 220, TSA 230, AAA 240, feature peers 250, destination address device 260, network 270, and network devices 275. User device 210, OFC 220, TSA 230, AAA 240, feature peers 250, destination address device 260, network 270, and network devices 275 may include the features described above in connection with one or more of, for example, FIGS. 1-5.

As further shown in FIG. 6, a customer, associated with user device 210, may wish to provide packets of an application flow to destination address device 260. In one example, the packets may need to traverse one or more feature peers 250 before being provided to destination address device 260. In a traditional service chain implementation, the packets of the application may be directed through TSA 230, as shown by a traditional service path 610. In traditional service path 610, TSA 230 may direct the packets to features/services implemented on feature peers 250. In one example, traditional service path 610 may provide the packets from user device 210 to TSA 230, and TSA 230 may forward the packets to the fourth feature peer 250-4. The fourth feature peer 250-4 may process the packets (e.g., with features/services available at feature peer 250-4), and may provide the processed packets back to TSA 230. TSA 230 may forward the packets to the third feature peer 250-3. The third feature peer 250-3 may process the packets (e.g., with features/services available at feature peer 250-3), and may provide the processed packets back to TSA 230. TSA 230 may forward the packets to the second feature peer 250-2. The second feature peer 250-2 may process the packets (e.g., with features/services available at feature peer 250-2), and may provide the processed packets back to TSA 230. TSA 230 may then forward the packets to destination address device 260. Packets provided by destination address device 260, and destined for user device 210, may traverse traditional service path 610 in a reverse order or via another service path that may include the same set of feature peers, another set of feature peers, or the same set of feature peers in a different order.

The traditional service chain implementation may be expensive because multiple server interfaces, network device interfaces, and paths across network 270 must be traversed between TSA 230 and feature peers 250. Furthermore, configuration of TSA 230 for traditional service path 610 may be complex and error-prone and may support only a static service graph.

Another traditional approach may include providing application stitching points in TSA 230 between overlay paths, which may allow development of arbitrary service graphs that vary over time. Although such an approach may be flexible and extensible, packets may still traverse a significant number of interfaces (e.g., on servers, network devices, etc.), devices, and paths, which may not be required for all application flows. Furthermore, in some cases, TSA 230 may need to recognize specific customers and/or flows by interacting with AAA 240.

As further shown in FIG. 6, TSA 230 may communicate with OFC 220 via an application programming interface (API) 620. OFC 220 may communicate with and/or configure network devices 275 and/or virtual switching functions in feature peers 250 via a protocol, such as the Openflow protocol 630. That is, the network device switching and forwarding functionality of FIG. 4 may be implemented on a dedicated or virtualized server as described in FIG. 3. TSA 230 may receive packets of an application flow from user device 210, and may inspect one or more of the packets and/or may receive information from AAA 240. Based on the information received from AAA 240 (e.g., about the customer, the packets, the application flow, etc.) and/or the inspection of the one or more packets, TSA 230 may determine a service graph 640 for the packets of the application flow. In one example, service graph 640 may cause the packets to traverse the fourth feature peer 250-4, the third feature peer 250-3, and the second feature peer 250-2 before being provided to destination address device 260. TSA 230 may provide service graph 640 to OFC 220 via API 620.

OFC 220 may receive service graph 640, and may configure network devices 275 to implement service graph 640. For example, OFC 220 may provide, to network devices 275, instructions to implement service graph 640. The instructions may cause network devices 275 to forward packets, generated by user device 210 and/or destination address device 260, to one or more feature peers 250. For example, the instructions may instruct network devices 275 to forward packets from user device 210 to the fourth feature peer 250-4, the third feature peer 250-3, the second feature peer 250-2, and destination address device 260. Network devices 275 may implement service graph 640 without changing the application flow. Thus, as shown in FIG. 6, network devices 275 may forward the packets of the application flow to the fourth feature peer 250-4, the third feature peer 250-3, the second feature peer 250-2, and finally to destination address device 260. Configuring network devices 275 with service graph 640 may reduce costs since fewer interfaces in network 270 may be traversed by packets traveling to/from user device 210 and/or destination address device 260.

Although FIG. 6 shows example components of environment 200, in other implementations, environment 200 may include fewer components, different components, differently arranged components, or additional components than depicted in FIG. 6. Alternatively, or additionally, one or more components of environment 200 may perform one or more other tasks described as being performed by one or more other components of environment 200.

Figure 7:
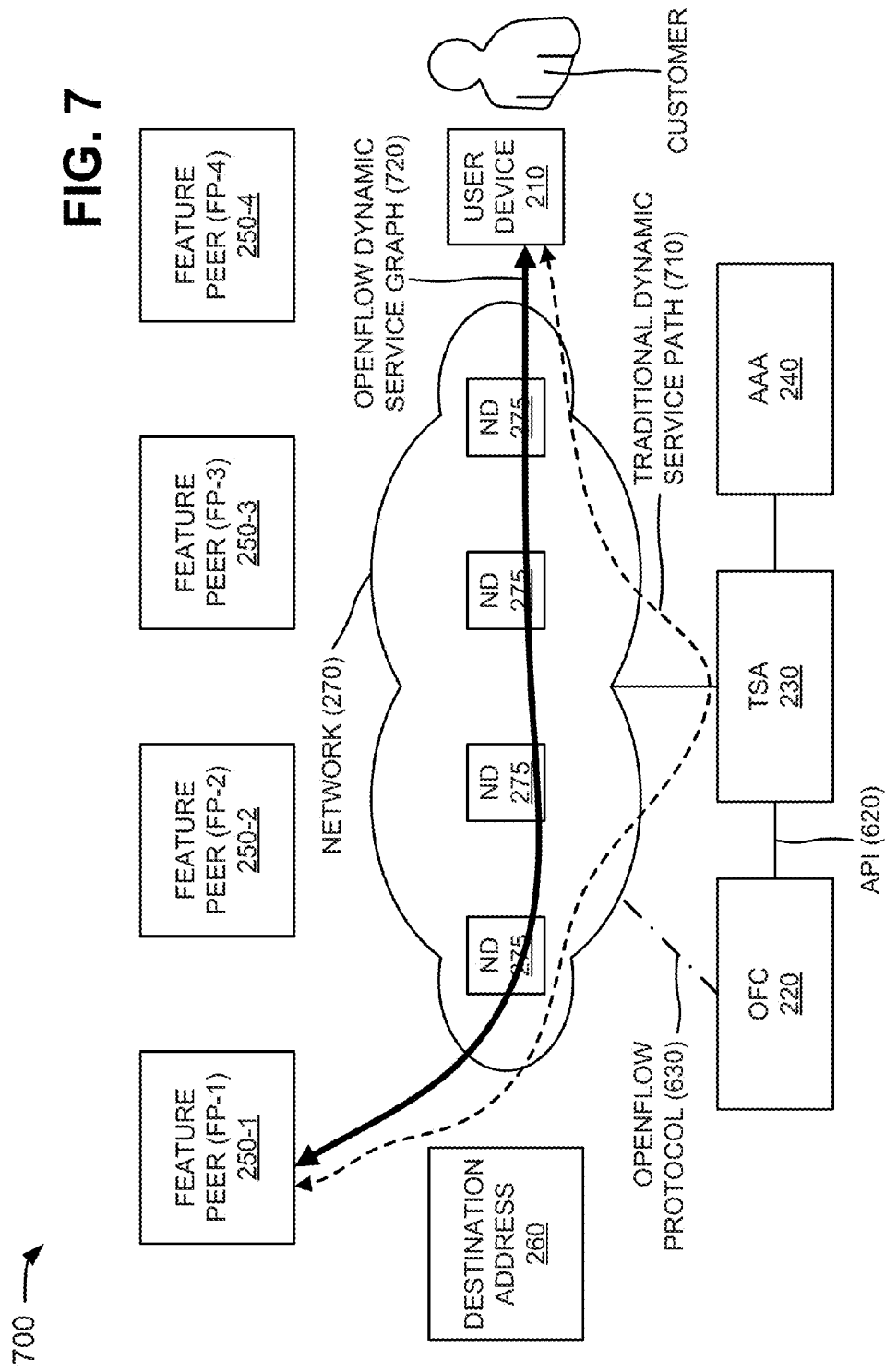
FIG. 7 is a diagram of example dynamic service chain operations capable of being performed by the environment depicted in FIG. 2.

FIG. 7 is a diagram of example dynamic service chain operations 700 capable of being performed by environment 200 (FIG. 2). As shown in FIG. 7, environment 200 may include user device 210, OFC 220, TSA 230, AAA 240, feature peers 250, destination address device 260, network 270, and network devices 275. User device 210, OFC 220, TSA 230, AAA 240, feature peers 250, destination address device 260, network 270, and network devices 275 may include the features described above in connection with one or more of, for example, FIGS. 1-6.

As further shown in FIG. 7, a customer, associated with user device 210, may wish to provide packets of an application flow to destination address device 260. In a traditional approach, TSA 230 may dynamically determine that the packets may be provided to a particular feature peer rather than to destination address device 260. For example, TSA 230 may determine that the packets may be provided to a closest cache server with available capacity (e.g., the first feature peer 250-1). TSA 230 may inspect the first packets and/or sample packets of the application flow, may consult with AAA 240, and/or may use other information to determine a traditional dynamic service path 710 for the packets. However, with traditional dynamic service path 710, the packets of the application flow must still traverse TSA 230. Such an arrangement may not achieve a lowest cost for implementing the service structure, and may require additional software development, such as statistics collection from the cache server. Alternatively, or additionally, a dynamic service path may be created by inserting a transcoder in line with packets being sent to the customer so that capabilities of user device 210 and the available bandwidth of the access network may be adjusted.

For application flows that occur frequently (e.g., long-lived application flows), it may be desirable to avoid the cost of traversing unnecessary feature peers 250, as well as TSA 230, for each packet of the flow. TSA 230 may receive the packets of the long-lived application flow from user device 210. TSA 230 may inspect the first packets and/or sample packets of the application flow, may consult AAA 240, and/or may use other information (e.g., information about a closest cache server with available capacity). Based on the information received from AAA 240 (e.g., about the customer, the packets, the application flow, etc.), the other information, and/or the inspection of the first/sample packets, TSA 230 may determine that the packets of the application flow need to be provided to the first feature peer 250-1 (e.g., a cache server or a transcoder). Based on this determination, TSA 230 may generate an openflow dynamic service graph 720 for the packets of the application flow. In one example, service graph 720 may cause the packets to traverse between user device 210 and the first feature peer 250-1. TSA 230 may provide service graph 720 to OFC 220 via API 620.

OFC 220 may receive service graph 720, and may configure network devices 275 to implement service graph 720. For example, OFC 220 may provide, to network devices 275, instructions to implement service graph 720. The instructions may cause network devices 275 to forward packets between user device 210 and the first feature peer 250-1. For example, the instructions may instruct network devices 275 to forward packets from user device 210 to the first feature peer 250-1, and may instruct network devices 275 to forward packets from the first feature peer 250-1 to user device 210. Thus, as shown in FIG. 7, network devices 275 may forward the subsequent packets of the application flow between user device 210 and the first feature peer 250-1. Service graph 720 may bypass unnecessary feature peers 250 (e.g., feature peers 250-2, 250-3, and 250-4), as well as TSA 230, which may reduce cost. OFC 220 may utilize time-out and/or polling of network devices 275 to detect an end of the long-lived application flow and/or to collect statistics.

Although FIG. 7 shows example components of environment 200, in other implementations, environment 200 may include fewer components, different components, differently arranged components, or additional components than depicted in FIG. 7. Alternatively, or additionally, one or more components of environment 200 may perform one or more other tasks described as being performed by one or more other components of environment 200.

Figure 8A:
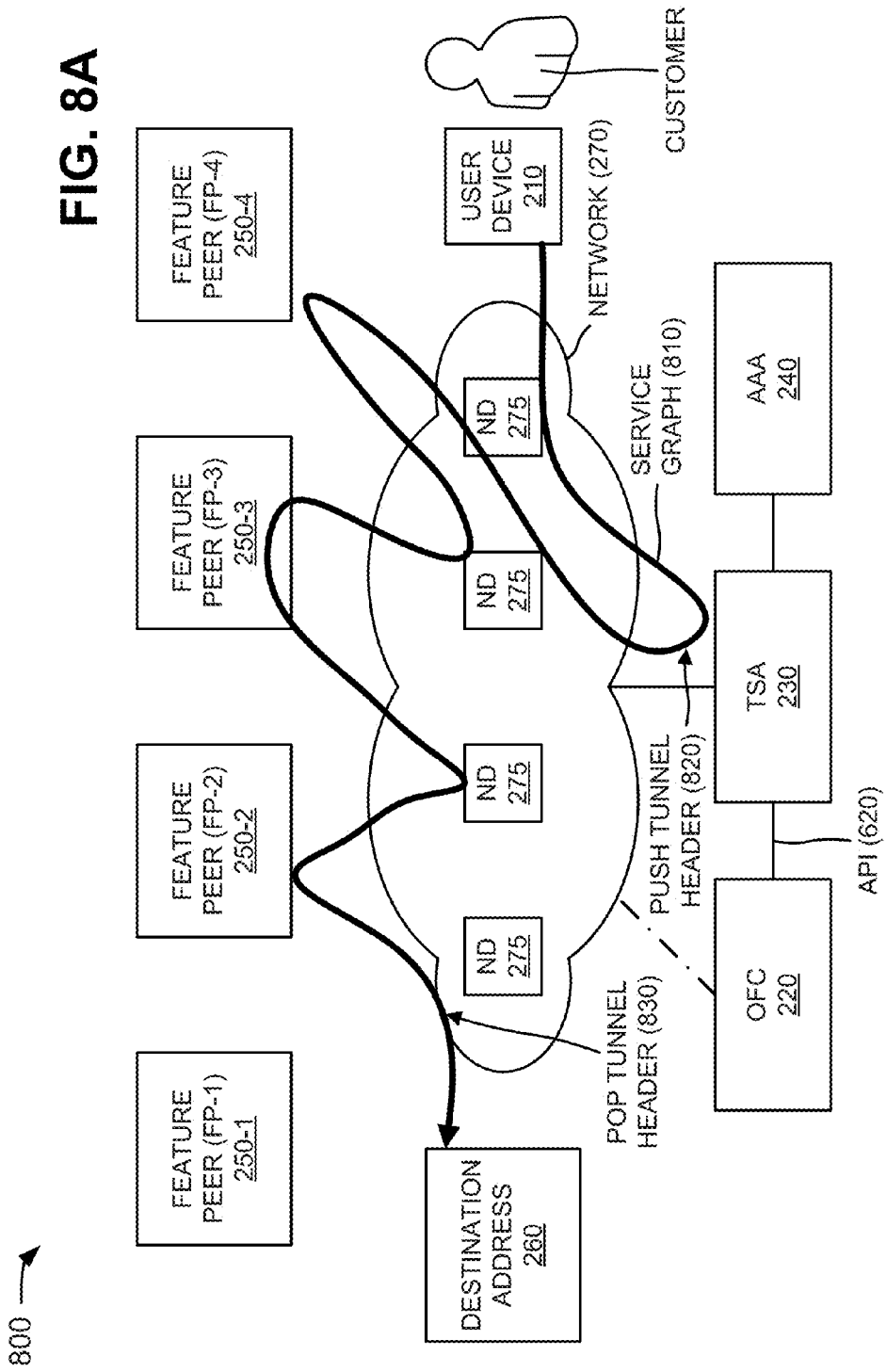

FIGS. 8A and 8B are diagrams of example service chain tunneling operations 800 capable of being performed by environment 200 (FIG. 2). As shown in FIGS. 8A and 8B, environment 200 may include user device 210, OFC 220, TSA 230, AAA 240, feature peers 250, destination address device 260, network 270, and network devices 275. User device 210, OFC 220, TSA 230, AAA 240, feature peers 250, destination address device 260, network 270, and network devices 275 may include the features described above in connection with one or more of, for example, FIGS. 1-7.

Interfaces of an access network (e.g., wireline or wireless), associated with user device 210, and interfaces of a service network (e.g., Internet), associated with destination address device 260, may depend on the type of access network and whether the features/services provided by feature peers 250 have any state information (e.g., customer identification, connection type, flow type identification, etc.) related to customers. When feature peers 250 do not have customer state information, application flow entries may be configured to be proportional to a number of service graphs, a topology of a service graph, etc. When one or more feature peers 250 in a service graph include customer state information needed to process application flows, then a mapping of customer addresses may be made to feature peers 250 that include the customer state information. Additional packets, communicated between TSA 230 and feature peers 250 and/or directly communicated between feature peers 250, may be used where customer state information is needed. In one example, a feature peer 250 may act as a repository (e.g., a storage device shared across multiple feature peers 250) for providing customer state information to service graphs.

In a wireline access network the mapping of the customer addresses may be provided because blocks of customer addresses may be assigned to edge network devices 275 of network 270. The blocks of customer addresses may be used as prefix entries in the service graph to direct packets to feature peers 250 that contain the corresponding customer state. In such a scenario, service graph 640 (FIG. 6) may be used.

In a wireless access network, a customer may move between different cells (e.g., base stations), which may cause application flows associated with the customer to move between different interfaces on packet data network (PDN) gateways (PGWs). Furthermore, a customer may leave radio coverage and then return to radio coverage, and an application flow from the same customer may appear with a different IP address at the same PGW and potentially on the same interface. In such a scenario, TSA 230 may determine an identification of a customer (e.g., by intercepting a RADIUS or DIAMETER accounting message and/or a pilot packet), and may generate a service graph that directs packets to feature peers 250 that contain state information associated with the identified customer.

As shown in FIG. 8A, a customer, associated with user device 210, may wish to provide packets of an application flow to destination address device 260. TSA 230 may receive and inspect the packets of the application flow from user device 210, and may determine an identification of a customer (e.g., by intercepting a RADIUS or DIAMETER accounting message). Based on the identification of the customer and the inspection of the packets, TSA 230 may determine that the packets should be directed to feature peers 250 that contain state information associated with the identified customer. TSA 230 may consult with AAA 240 and/or may inspect some packets of the application flow to determine that the packets may require a tunnel (e.g., a set of stacked VLANs, a GRE tunnel with an embedded identifier, an MPLS label stack, an Ethernet PBB tag, and/or other packet fields used as a tunnel/feature header) to cause the packets to flow to feature peers 250 that include the customer state information. The tunnel header portion (e.g., a MAC address, a destination IP address of a GRE tunnel, or the uppermost label(s) in an MPLS label stack) may be used to direct packets to the next node(s) in the service graph while the feature header portion may be used by the feature itself (e.g., an inner and/or outer VLAN, a GRE tunnel key field, or an MPLS label deeper in the label stack). Based on this determination, TSA 230 may generate a service graph 810 for the packets of the application flow. In one example, service graph 810 may cause the packets to traverse TSA 230, the fourth feature peer 250-4, the third feature peer 250-3, and the second feature peer 250-2 before being provided to destination address device 260. TSA 230 may provide service graph 810 to OFC 220 via API 620.

OFC 220 may receive service graph 810, and may configure network devices 275 in network 270 to implement service graph 810. For example, OFC 220 may provide, to network devices 275, instructions to implement service graph 810. The instructions may cause network devices 275 to forward packets, generated by user device 210, to one or more feature peers 250. For example, the instructions may instruct network devices 275 to forward packets from user device 210 to TSA 230, the fourth feature peer 250-4, the third feature peer 250-3, the second feature peer 250-2, and destination address device 260.

TSA 230 may add (or push) tunnel headers to the packets, as indicated by reference number 820, before providing the packets to the first network device 275 in service graph 810. Network devices 275 may implement service graph 810 by forwarding the packets of the application flow to the fourth feature peer 250-4, the third feature peer 250-3, the second feature peer 250-2, and finally to destination address device 260. The last network device 275 of service graph 810 may remove (or pop) the tunnel headers from the packets, as indicated by reference number 830, before providing the packets to destination address device 260.

As shown in FIG. 8B, destination address device 260 may wish to provide packets of an application flow to user device 210. TSA 230 may receive and inspect the packets of the application flow from destination address device 260, and may determine an identification of a customer associated with user device 210. Based on the identification of the customer and the inspection of the packets, TSA 230 may determine that the packets should be directed to feature peers 250 that contain state information associated with the identified customer. TSA 230 may consult with AAA 240 and/or may inspect some packets of the application flow to determine that the packets may require a tunnel (e.g., a set of stacked VLANs, a GRE tunnel with an embedded identifier, an MPLS label stack, an Ethernet PBB tag, or other packet fields used as a tunnel/feature header) to cause the packets to flow to feature peers 250 that include the customer state information. Based on this determination, TSA 230 may generate a service graph 840 for the packets of the application flow. In one example, service graph 840 may cause the packets to traverse TSA 230, the second feature peer 250-2, the third feature peer 250-3, and the fourth feature peer 250-4 before being provided to user device 210. TSA 230 may provide service graph 840 to OFC 220 via API 620.

OFC 220 may receive service graph 840, and may configure network devices 275 in network 270 to implement service graph 840. For example, OFC 220 may provide, to network devices 275, instructions to implement service graph 840. The instructions may cause network devices 275 to forward packets, generated by destination address device 260, to one or more feature peers 250. For example, the instructions may instruct network devices 275 to forward packets from destination address device 260 to TSA 230, the second feature peer 250-2, the third feature peer 250-3, the fourth feature peer 250-4, and user device 210.

TSA 230 may add (or push) tunnel headers to the packets, as indicated by reference number 850, before providing the packets to the first network device 275 in service graph 840. Network devices 275 may implement service graph 840 by forwarding the packets of the application flow to the second feature peer 250-2, the third feature peer 250-3, the fourth feature peer 250-4, and finally to user device 210. The last network device 275 of service graph 840 may remove (or pop) the tunnel/feature headers from the packets, as indicated by reference number 860, before providing the packets to user device 210.

Directing packets in such a manner may require use of a VLAN or a tunnel, as provided by TSA 230, which may cause the packets to flow through a service graph of feature peers 250 that contain the customer state information. Network devices 275 may push and pop a tunnel header on packets at each feature peer 250 in the service graph. The last network device 275 may pop the tunnel header before sending the packets to user device 210 and/or destination address device 260. The packet traversal of TSA 230 and the initial pushing of a tunnel header on the packets may occur at different points depending upon a direction of the packet flow, as illustrated in FIGS. 8A and 8B.

Although not as cost effective as service graph 640 shown in FIG. 6, the arrangement depicted in FIGS. 8A and 8B may be less expensive than having every packet, for each feature peer 250, traverse TSA 230 as is the case in traditional approaches. Alternatively, or additionally. TSA 230 may generate one or more service graphs that include feature peers 250 with customer state information and feature peers 250 without customer state information. Alternatively, or additionally, customers may require that a service graph be reliable and recover rapidly from failures. Current TSA-based deployments often deploy a redundant set of feature peers 250 connected by ports in a one-to-one redundancy configuration. In an example implementation, feature peers 250 may share restoration feature peer 250 (e.g., for shared access to customer state information) where possible, with a goal being to achieve a one-to-N redundancy configuration.

Although FIGS. 8A and 8B show example components of environment 200, in other implementations, environment 200 may include fewer components, different components, differently arranged components, or additional components than depicted in FIGS. 8A and 8B. Alternatively, or additionally, one or more components of environment 200 may perform one or more other tasks described as being performed by one or more other components of environment 200.

FIG. 9 is a diagram of example components of an example portion 900 of environment 200 (FIG. 2). As shown in FIG. 9, environment portion 900 may include user device (UD) 210, OFC 220, TSA 230, feature peers 250-2, 250-3, and 250-4, destination address device (DA) 260, and network devices 275-1 and 275-2. User device 210, OFC 220, TSA 230, feature peers 250-2, 250-3, and 250-4, destination address device 260, and network devices 275-1 and 275-2 may include the features described above in connection with one or more of, for example, FIGS. 1-8B.

As further shown in FIG. 9, TSA 230 and feature peer 250-4 may be combined in a single device that includes a TSA 905, an operating system 910, a security application 915, an operating system 920, and a hypervisor 925. TSA 905 may include a traffic steering application that provides the functionality of TSA 230, as described herein. Operating system 910 may include a guest operating system, such as, for example, a Microsoft Windows Desktop operating system, a Microsoft Windows Server operating system, a Linux operating system, etc. Security application 915 may include an application that provides packet/application flow services/ features (e.g., security-related services, such as intrusion detection/mitigation) associated with feature peer 250-4. Operating system 920 may include a guest operating system, such as, for example, a Microsoft Windows Desktop operating system, a Microsoft Windows Server operating system, a Linux operating system, etc. Hypervisor 925 may provide hardware and/or software virtualization techniques that allow multiple operating systems (e.g., "guest operating systems") to execute concurrently on a host computer. Hypervisor 925 may present to the guest operating systems a virtual operating platform that provides a compute environment described in connection with FIG. 3, and may manage the execution of the guest operating systems.

Feature peer 250-2 and feature peer 250-3 may be combined in a single device that, for example, includes a statistics collection application 930, an operating system 935, a content filtering application 940, an operating system 945, and a hypervisor 950. Statistics collection application 930 may include an application that provides packet/application flow services/features (e.g., statistics collection services) associated with feature peer 250-2. Operating system 935 may include a guest operating system, such as, for example, a Microsoft Windows Desktop operating system, a Microsoft Windows Server operating system, a Linux operating system, etc. Content filtering application 940 may include an application that provides packet/application flow services/features (e.g., content filtering-related services) associated with feature peer 250-3. Operating system 945 may include a guest operating system, such as, for example, a Microsoft Windows Desktop operating system, a Microsoft Windows Server operating system, a Linux operating system, etc. Hypervisor 950 may provide hardware virtualization techniques that allow multiple operating systems (e.g., "guest operating systems") to execute concurrently on a host computer. Hypervisor 950 may present to the guest operating systems a virtual operating platform, and may manage the execution of the guest operating systems.

As further shown in FIG. 9, network devices 275-1 and 275-2 may include ports that are numbered "1" to "4." Port 1 may connect network device 275-1 and destination address device 260, and may connect network device 275-2 and user device 210. Port 2 may connect network device 275-1 and network device 275-2. Port 3 may connect network device 275-1 and feature peers 250-2/250-3, and may connect network device 275-2 and TSA 230/feature peer 250-4. Port 4 may connect network devices 275-1 and 275-2 with other devices of network 270, such as a network attached storage (NAS) device 960 (e.g., a cache server). Network devices 275-1 and 275-2 may also connect to OFC 220. Address and VLAN information may be associated with TSA 230 and feature peers 250-2, 250-3, and 250-4. For example, a media access control (MAC) address (e.g., MAC=c) may be associated with feature peer 250-2, and a MAC address (e.g., MAC=d) may be associated with feature peer 250-3. A VLAN (e.g., VLAN=100) and a MAC address (e.g., MAC=a) may be associated with TSA 230, and a VLAN (e.g., VLAN=100) and a MAC address (e.g., MAC=b) may be associated with feature peer 250-4.

Network devices 275-1 and 275-2 may include a match action table (MAT) 955 that stores packet forwarding instructions associated with service graphs configured in network devices 275-1 and 275-2. MAT 955 may include a match field, an action field, and a table field. The match field may include information used to compare to information associated with a packet. For example, the match field may include entries for an incoming physical or logical port (InPort), a generalized description of an IP destination address (DA) or source address (SA), a source or a destination MAC (SMAC or DMAC) address, and/or a VLAN identifier. The match field may also include a priority associated with the entries in order to determine which action should be applied when multiple entries of the match field are met. When a match occurs with an entry in the match field, the instructions in the action field and a corresponding set of one or more entries in the table field are performed. Entries of the table field may include, for example, forwarding to an outgoing port (OutPort) and changing a destination MAC (DMAC) address to be placed in the packet.

Although FIG. 9 shows example components of environment portion 900, in other implementations, environment portion 900 may include fewer components, different components, differently arranged components, or additional components than depicted in FIG. 9. Alternatively, or additionally, one or more components of environment portion 900 may perform one or more other tasks described as being performed by one or more other components of environment portion 900. For example, MAT 955 may be implemented in operating system 920 and/or hypervisor 925.

FIG. 10 is a flow diagram of example packet flows through an example portion 1000 of environment 200 (FIG. 2). As shown in FIG. 10, environment portion 1000 may include user device 210, OFC 220, TSA 230, feature peers 250, destination address device 260, and network 270. User device 210, OFC 220, TSA 230, feature peers 250, destination address device 260, and network 270 may include the features described above in connection with one or more of, for example, FIGS. 1-9.

As further shown in FIG. 10, a first set of packet flows may be referred to as a traffic steering packet flow 1010. Traffic steering packet flow 1010 may correspond to the packet flow shown and described in connection with FIG. 8A. Traffic steering packet flow 1010 may include user device 210 providing packets to network 270, and network 270 providing the packets to TSA 230. TSA 230 may add tunnel/feature headers to the packets, and may forward the packets to network 270. Network 270 may forward the packets to feature peer 250-4, and feature peer 250-4 may process and return the packets to network 270. Network 270 may forward the packets to feature peer 250-3, and feature peer 250-3 may process and return the packets to network 270. Network 270 may forward the packets to feature peer 250-2, and feature peer 250-2 may process and return the packets to network 270. Network 270 may remove the tunnel/feature headers from the packets and forward the packets to destination address device 260. In one example, destination address device 260 may determine that features requested by the packets are available in feature peer 250-1. In response to a hypertext transfer protocol (HTTP) GET CONTENT message, destination address device 260 may generate a HTTP REDIRECT request (e.g., requesting that the packets be redirected to feature peer 250-1), and may provide the request to user device 210 via a path that is the reverse of the path traversed by the packets (not shown in FIG. 10).

Based on the REDIRECT request, a second set of packet flows, referred to as a transient packet flow 1020, may be generated. Transient packet flow 1020 may include user device 210 providing packets (e.g., a HTTP GET CACHE request) to network 270, and network 270 providing the packets to TSA 230. TSA 230 may invoke the API (e.g., API 620) with OFC 220, and may forward the packets to feature peer 250-1 based on communication with OFC 220. Feature peer 250-1 may process the packets, and may return the packets to network 270. Network 270 may forward the packets (e.g., a "200 OK" response) to user device 210. Network 270 and OFC 220 may exchange packets until OFC 220 creates a shortcut packet flow 1030.

A third set of packet flows may be referred to as shortcut packet flow 1030. Shortcut packet flow 1030 may correspond to the packet flow shown and described in connection with FIG. 7. Shortcut packet flow 1030 may include user device 210 providing packets (e.g., a HTTP GET request) to network 270, and network 270 providing the packets directly to feature peer 250-1 (e.g., rather than to TSA 230 as in transient packet flow 1020). Feature peer 250-1 may process the packets, and may return the packets to network 270. Network 270 may forward the packets (e.g., a "200 OK" response) to user device 210. When the packet flow stops, network 270 and OFC 220 may exchange packets. For example, network 270 may provide, to OFC 220, an indication that a flow timer has expired and that a flow entry has been removed. Based on the indication, OFC 220 may retrieve usage statistics from network 270, and may provide the usage statistics, via additional packets, to feature peer 250-2.

Although FIG. 10 shows example components of environment portion 1000, in other implementations, environment portion 1000 may include fewer components, different components, differently arranged components, or additional components than depicted in FIG. 10. Alternatively, or additionally, one or more components of environment portion 1000 may perform one or more other tasks described as being performed by one or more other components of environment portion 1000.

Figure 11:
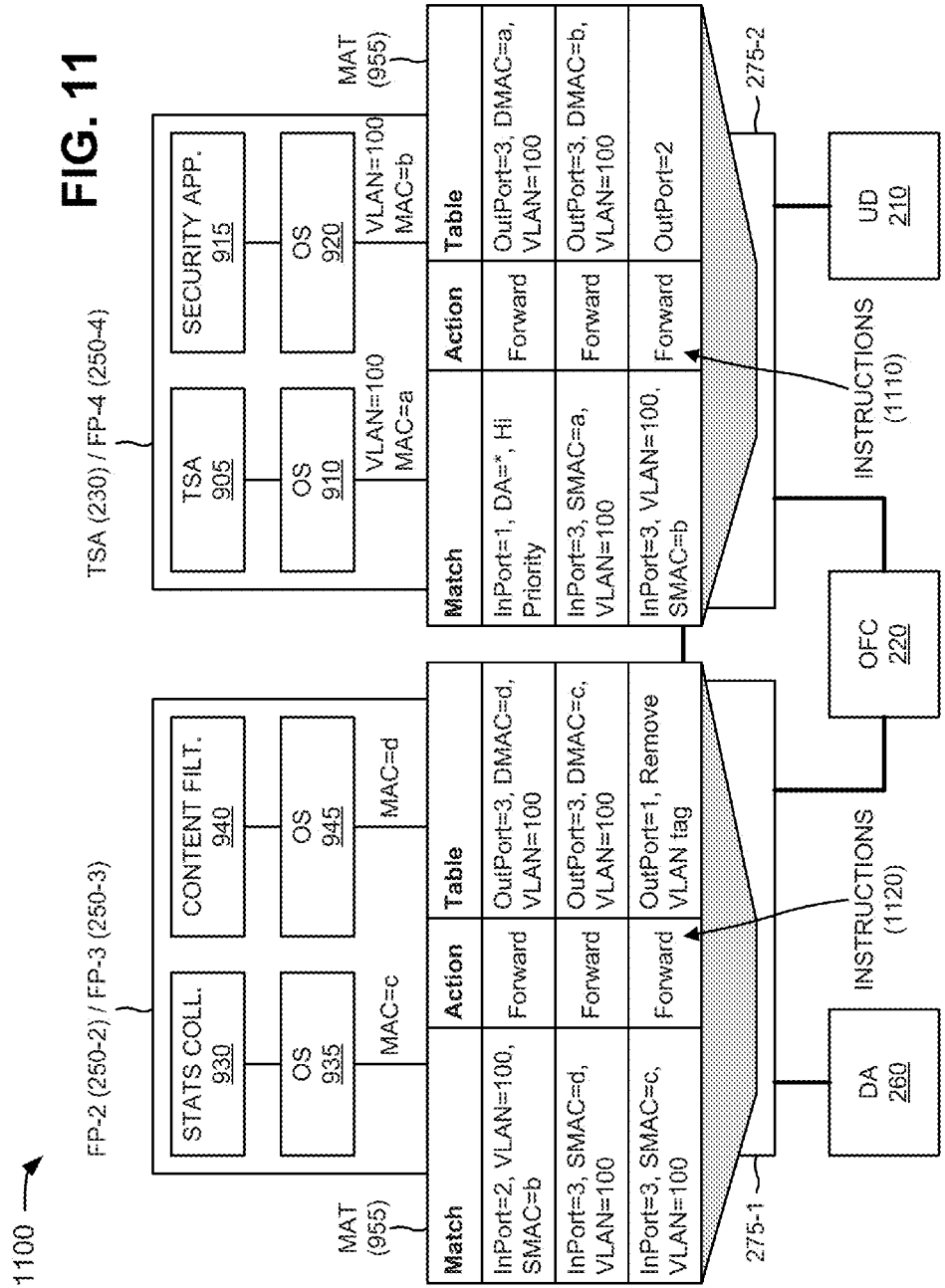
FIG. 11 is a diagram of example traffic steering packet flow operations capable of being performed by an example portion of the environment illustrated in FIG. 2.

FIG. 11 is a diagram of example traffic steering packet flow operations capable of being performed by an example portion 1100 of environment 200 (FIG. 2). In one example, the traffic steering packet flow operations depicted in FIG. 11 may correspond to traffic steering packet flow 1010 (FIG. 10) and the packet flow shown and described in connection with FIG. 8A.

As shown in FIG. 11, environment portion 1100 may include user device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955. User device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955 may include the features described above in connection with one or more of, for example, FIGS. 1-10.

As further shown in FIG. 11, MAT 955 of network device 275-2 may include forwarding instructions 1110, and MAT 955 of network device 275-1 may include forwarding instructions 1120. A first row of forwarding instructions 1110 may include a high priority match on a wildcard IP destination address (DA=*) for packets received on incoming port 1 (InPort=1, see FIG. 9), and an action to forward the packet. The table in the first row of forwarding instructions 1110 may include instructions to direct a packet (e.g., received from user device 210) to outgoing port 3 (OutPort=3, see FIG. 9), change a destination MAC (DMAC) address to "a," and push a VLAN tag of "100," which may direct the packet to TSA 905. TSA 905 may process the packet, and may return the packet over port 3 (see FIG. 9) to network device 275-2. The incoming port 3 (InPort=3), the VLAN tag (VLAN=100), and the SMAC address (SMAC=a) of the packet may match an entry in the second row of forwarding instructions 1110. The second row of forwarding instructions 1110 may include an action to forward the packet. The table in the second row of forwarding instructions 1110 may include instructions to direct the packet to outgoing port 3 (OutPort=3, see FIG. 9), change a DMAC address to "b," and push a VLAN tag of "100," which may forward the packet to security application 915. If security application 915 allows the packet to proceed, the packet may be forwarded on port 3 (see FIG. 9) to network device 275-2. The packet from security application 915 may match the InPort=3, VLAN=100, SMAC=b entry in the third row of forwarding instructions 1110. Based on the match, network device 275-2 may forward the packet on outgoing port 2 (OutPort=2, see FIG. 9), which connects to network device 275-1.

Network device 275-1 may receive the packet, and may process the packets according to forwarding instructions 1120. The packet may match the InPort=2, VLAN=100, SMAC=b entry in the first row forwarding instructions 1120. Based on the match, network device 275-1 may direct the packet to outgoing port 3 (OutPort=3), change a DMAC address to "d," and push a VLAN tag of "100," which may forward the packet to content filtering application 940. If content filtering application 940 allows the packet to proceed, the packet may be sent on port 3 to network device 275-1. The packet may match the InPort=3, SMAC=d, VLAN=100 entry in the second row of forwarding instructions 1120. Based on the match, network device 275-1 may direct the packet to outgoing port 3 (OutPort=3), change a DMAC address to "c," and push a VLAN tag of "100," which may forward the packet to statistics collection application 930. Statistics collection application 930 may forward the packet to port 3 of network device 275-1. The packet may match the InPort=3, SMAC=c, and VLAN=100 entry in the third row of forwarding instructions 1120. Based on the match, network device 275-1 may direct the packet to outgoing port 1 (OutPort=1) and may remove the VLAN tag, which may forward the packet to destination address device 260. A similar process may be performed for the packet flow, in the direction from destination address device 260 to user device 210, as shown and described in connection with FIG. 8B.

Although FIG. 11 shows example components of environment portion 1100, in other implementations, environment portion 1100 may include fewer components, different components, differently arranged components, or additional components than depicted in FIG. 11. Alternatively, or additionally, one or more components of environment portion 1100 may perform one or more other tasks described as being performed by one or more other components of environment portion 1100.

Figure 12:
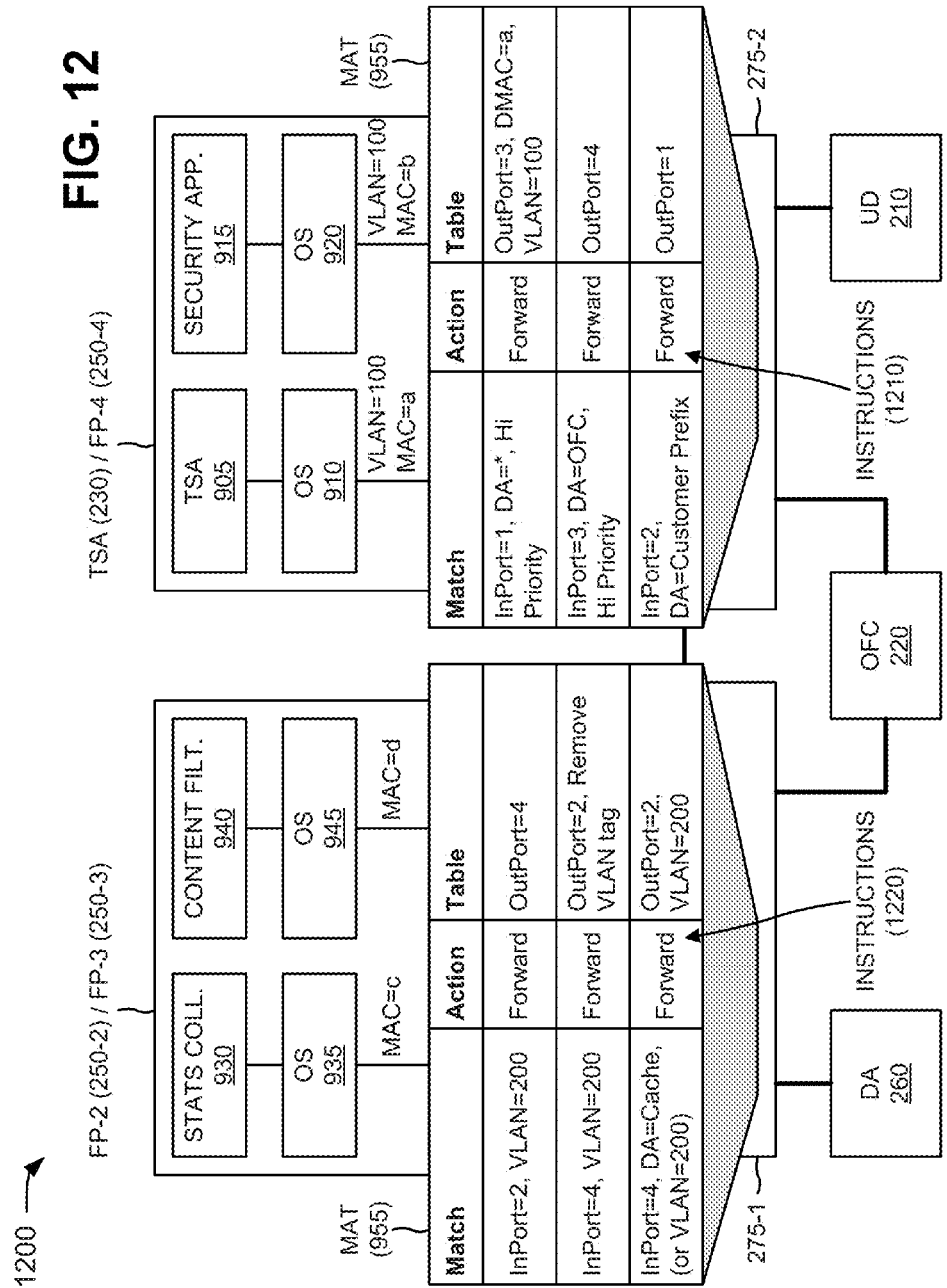
FIG. 12 is a diagram of example transient packet flow operations capable of being performed by an example portion of the environment depicted in FIG. 2.

FIG. 12 is a diagram of example transient packet flow operations capable of being performed by an example portion 1200 of environment 200 (FIG. 2). The operations depicted in FIG. 12 may be transient in a sense that TSA 230 may recognize a need to modify the service graph to a target state, but may not have issued commands to network devices 275 and/or feature peers 250. In one example, the transient packet flow operations depicted in FIG. 12 may correspond to transient packet flow 1020 (FIG. 10).

As shown in FIG. 12, environment portion 1200 may include user device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955. User device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955 may include the features described above in connection with one or more of, for example, FIGS. 1-11.

As further shown in FIG. 12, MAT 955 of network device 275-2 may include forwarding instructions 1210, and MAT 955 of network device 275-1 may include forwarding instructions 1220. A first row of forwarding instructions 1210 may include a high priority match on a wildcard IP destination address (DA=*) for packets received on incoming port 1 (InPort=1, see FIG. 9), and an action to forward the packet. The table in the first row of forwarding instructions 1210 may include instructions to direct a packet (e.g., received from user device 210) to outgoing port 3 (OutPort=3), change a destination MAC (DMAC) address to "a," and push a VLAN tag of "100," which may direct the packet to TSA 905. TSA 905 may direct the packet to a cache when a cache hit is detected. TSA 905 may send a message, over API 620 between TSA 230 and OFC 220 (FIG. 6), requesting that OFC 220 set up a "shortcut" packet flow to the cache server, as shown in FIG. 7. A second row of forwarding instructions 1210 may include a match on InPort=3 and DA=OFC, and an action to forward the packet. The table in the second row of forwarding instructions 1210 may include instructions to direct the packet to outgoing port 4 (OutPort=4), which may direct the packet from TSA 905 to OFC 220 and/or NAS device 960. OFC 220 may receive the packet and may send the packet to network device 275-1.

The packet may match the InPort=4, DA=Cache entry in the third row of forwarding instructions 1220. Based on the match, network device 275-1 may forward the packet on outgoing port 2 (OutPort=2) and may push a VLAN tag of "200," which may direct the packet to a cache server (not shown but connected to port 4, FIG. 9). The cache server may return the packet with on port 4 with VLAN=200 of network device 275-1. The packet may match the InPort=4, VLAN=200 entry in the second row of forwarding instructions 1220. Based on the match, network device 275-1 may forward the packet on outgoing port 2 (OutPort=2) and may remove the VLAN tag, which may direct the packet to network device 275-2. The packet may match the InPort=2, DA=Customer Prefix entry in the third row of forwarding instructions 1210. Based on the match, network device 275-2 may forward the packet on outgoing port 1 (OutPort=1). This process may continue until OFC 220 creates a "shortcut" flow entry, which may result in the shortcut packet flow shown and described in connection with FIG. 7 and FIG. 13 (below).

Although FIG. 12 shows example components of environment portion 1200, in other implementations, environment portion 1200 may include fewer components, different components, differently arranged components, or additional components than depicted in FIG. 12. Alternatively, or additionally, one or more components of environment portion 1200 may perform one or more other tasks described as being performed by one or more other components of environment portion 1200.

Figure 13:
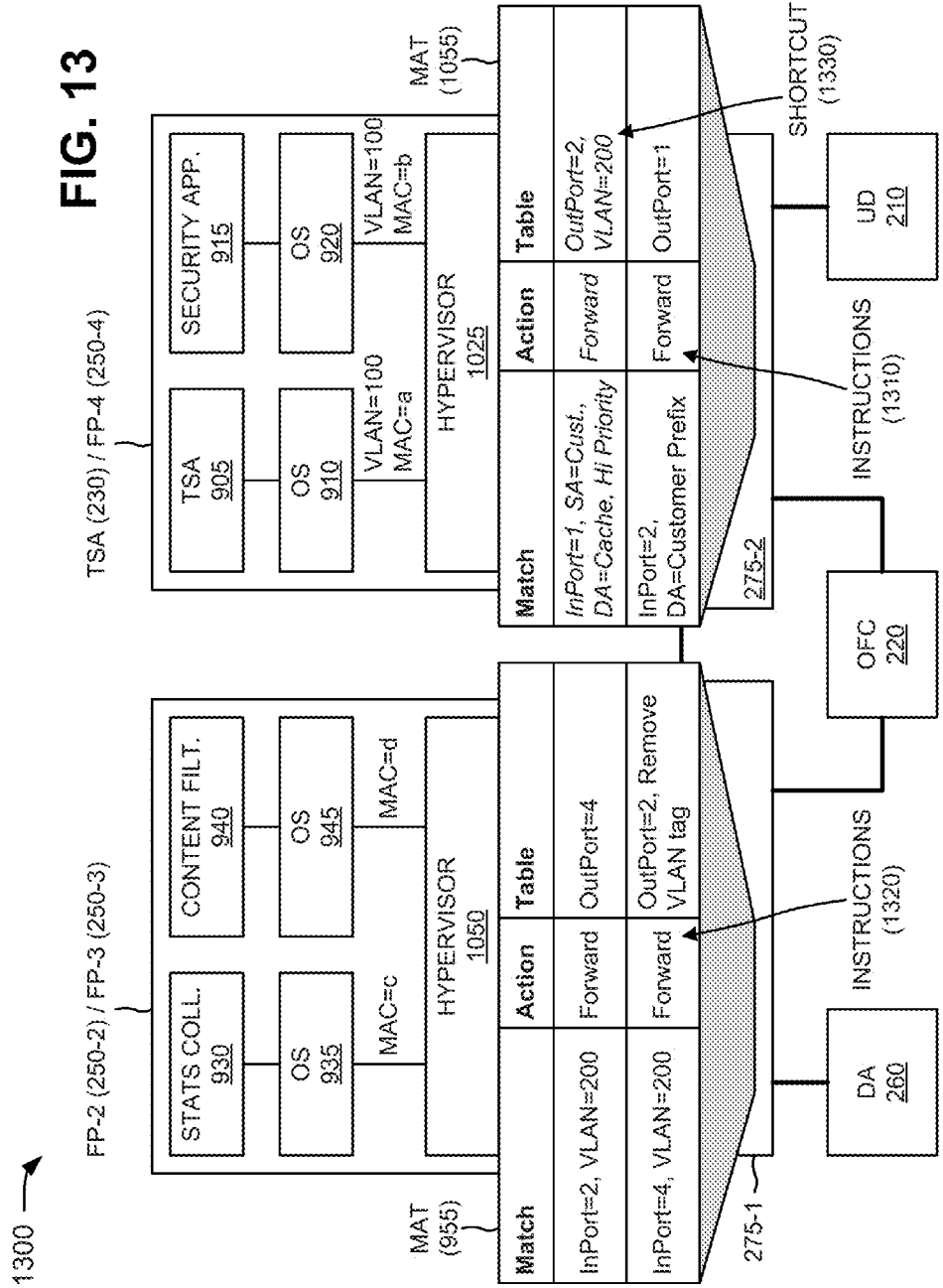
FIG. 13 is a diagram of example shortcut packet flow operations capable of being performed by an example portion of the environment illustrated in FIG. 2.

FIG. 13 is a diagram of example shortcut packet flow operations capable of being performed by an example portion 1300 of environment 200 (FIG. 2). In one example, the shortcut packet flow operations depicted in FIG. 13 may correspond to shortcut packet flow 1030 (FIG. 10) and the packet flow shown and described in connection with FIG. 7.

As shown in FIG. 13, environment portion 1300 may include user device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955. User device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955 may include the features described above in connection with one or more of, for example, FIGS. 1-12.

As further shown in FIG. 13, MAT 955 of network device 275-2 may include forwarding instructions 1310, and MAT 955 of network device 275-1 may include forwarding instructions 1320. A first row of forwarding instructions 1310 may include entries for a shortcut packet flow 1330. Shortcut packet flow 1330 may include a match entry (InPort=1, SA=Customer, DA=Cache), an action entry (e.g., forward a packet), and a table entry (OutPort=2, VLAN=200). Port numbers for network devices 275-1 and 275-2 are shown in FIG. 9. The remaining entries of forwarding instructions 1310 and forwarding instructions 1320 may be the same as the entries of forwarding instructions 1110/1210 and forwarding instructions 1120/1220, respectively. Shortcut packet flow 1330 may enable flow-specific usage counters to be collected, and a flow expiration to be detected.

Based on shortcut packet flow 1330, packets from user device 210 may be directed from user device 210 to a cache server (e.g., feature peer 250-1) and back to user device 210, and may bypass other feature peers 250. In this example, a termination of the packet flow may be determined when a network device 275, located at a user device-facing edge of network 270, detects that shortcut packet flow 1330 has timed out (i.e., no packets have been received for the MAT entry for a predetermined time interval). At this point, shortcut packet flow 1330 may be removed (e.g., by network device 275 or OFC 220) from forwarding instructions 1310. For packets not addressed to DA=Cache, the packet flow described above in connection with FIGS. 8A, 11, and 12 may be utilized. If a packet is addressed to DA=Cache, the transient packet flow (FIG. 12) may be utilized until OFC 220 creates the shortcut packet flow.

Although FIG. 13 shows example components of environment portion 1300, in other implementations, environment portion 1300 may include fewer components, different components, differently arranged components, or additional components than depicted in FIG. 13. Alternatively, or additionally, one or more components of environment portion 1300 may perform one or more other tasks described as being performed by one or more other components of environment portion 1300.

Figure 14:
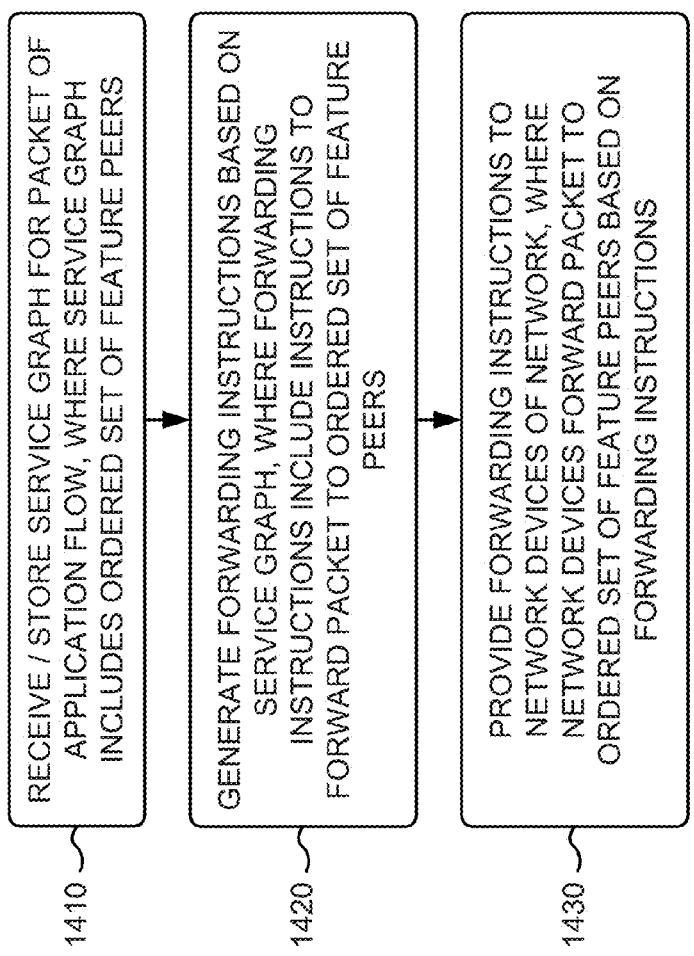
FIG. 14 is a flow chart of an example process for generating and providing feature peer network forwarding instructions to network devices.

FIG. 14 is a flow chart of an example process 1400 for generating and providing feature peer network forwarding instructions to network devices. In one implementation, process 1400 may be performed by OFC 220. Alternatively, or additionally, some or all of process 1400 may be performed by another device or group of devices, including or excluding OFC 220.

As shown in FIG. 14, process 1400 may include receiving and/or storing a service graph for a packet of an application flow, where the service graph includes an ordered set of feature peers and forwarding requirements between the feature peers (e.g., unicast, replicate, load balance, etc.) (block 1410), and generating forwarding instructions based on the service graph and forwarding requirements, where the forwarding instructions include instructions to forward the packet to the ordered set of feature peers (block 1420). For example, in an implementation described above in connection with FIG. 5, a customer, associated with user device 210, may wish to provide packet 510 of an application flow to destination address device 260. TSA 230 may consult with AAA 240 and/or may inspect packet 510 to determine one or more service graphs 520 and user state information for packet 510 of the application flow. TSA 230 may provide service graphs 520 to OFC 220, and OFC 220 may receive and store service graphs 520. A first service graph (SG-1), of service graphs 520, may cause packet 510 to traverse the fourth feature peer 250-4, the third feature peer 250-3, and the second feature peer 250-2 before being provided to destination address device 260. OFC 220 may generate first forwarding instructions that include a MAT that instructs network devices 275 to implement the first service graph.

As further shown in FIG. 14, process 1400 may include providing the forwarding instructions to network devices of a network, where the network devices, and/or switching functions in the feature peers, forward the packet to the ordered set of feature peers based on the forwarding instructions (block 1430). For example, in an implementation described above in connection with FIG. 5, OFC 220 may provide the first forwarding instructions to network devices 275. The first forwarding instructions may include a MAT that instructs network devices 275 to implement the first service graph. Based on the first forwarding instructions, network devices 275 may forward packet 510 of the application flow to the fourth feature peer 250-4, the third feature peer 250-3, the second feature peer 250-2, and finally to destination address device 260. The choice of feature peers 250 in a service graph may depend upon whether the features require customer state information. In one example, feature peers 250 may access customer state information from another feature peer 250 in the service graph. Alternatively, or additionally, additional packets may be exchanged between feature peers 250 and may include the customer state information or how the customer state information can be accessed (e.g., from shared network attached storage).

Figure 15:
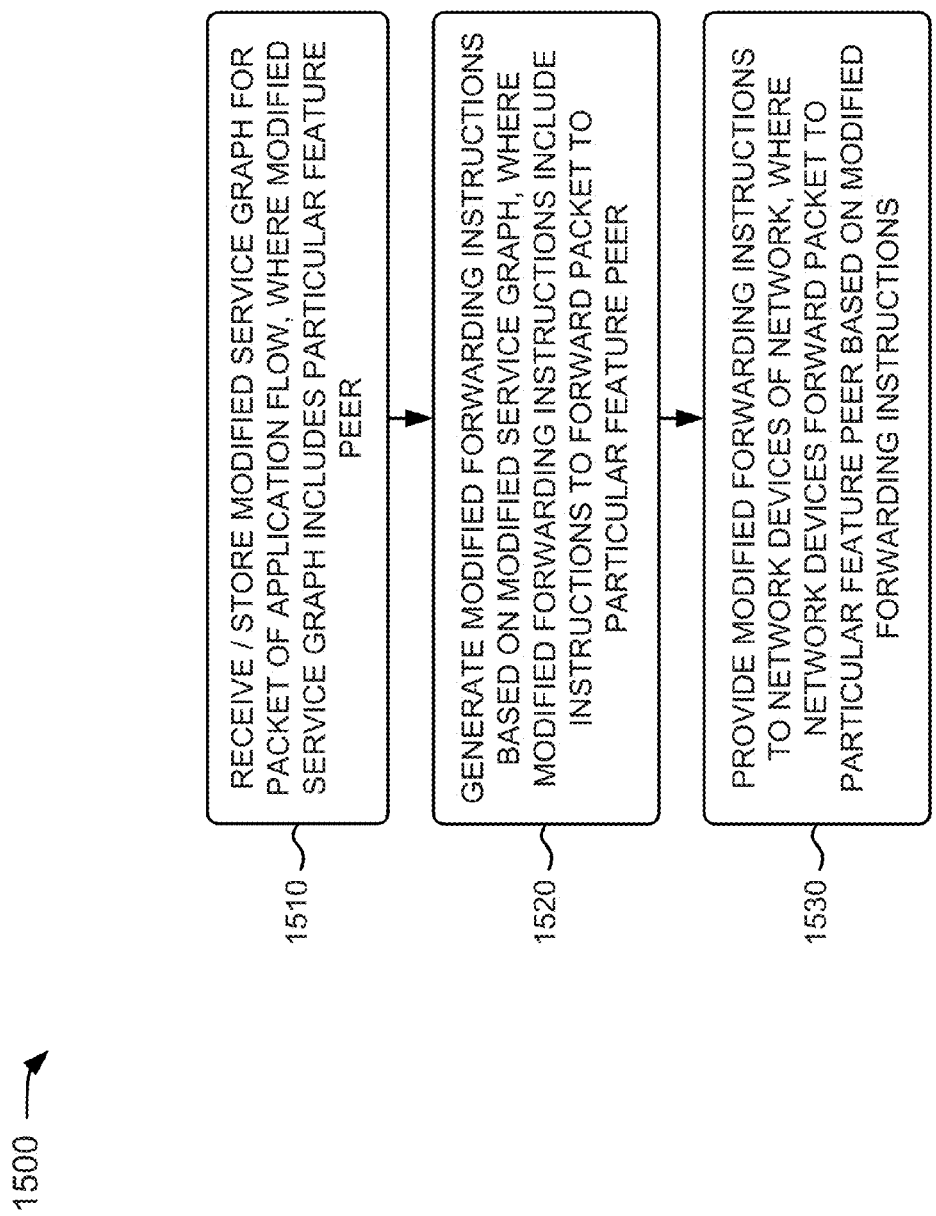
FIG. 15 is a flow chart of an example process for generating and providing modified feature peer network forwarding instructions to network devices.

FIG. 15 is a flow chart of an example process 1500 for generating and providing modified feature peer network forwarding instructions to network devices. In one implementation, process 1500 may be performed by OFC 220. Alternatively, or additionally, some or all of process 1500 may be performed by another device or group of devices, including or excluding OFC 220.

As shown in FIG. 15, process 1500 may include receiving and/or storing a modified service graph for a packet of an application flow, where the modified service graph includes a particular feature peer (block 1510), and generating modified forwarding instructions based on the modified service graph, where the modified forwarding instructions include instructions to forward the packet to the particular feature peer (block 1520). For example, in an implementation described above in connection with FIG. 5, a customer, associated with user device 210, may wish to provide packet 510 of an application flow to destination address device 260. TSA 230 may consult with AAA 240 and/or may inspect packet 510 to determine one or more service graphs 520 for packet 510 of the application flow. TSA 230 may provide service graphs 520 to OFC 220, and OFC 220 may receive and store service graphs 520. A second service graph (SG-2), of service graphs 520, may cause packet 510 to be provided to the first feature peer 250-1 (e.g., a cache server). OFC 220 may generate second forwarding instructions that include a MAT that instructs network devices 275 to implement the second service graph.

As further shown in FIG. 15, process 1500 may include providing the modified forwarding instructions to network devices of a network, where the network devices forward the packet to the particular feature peer based on the modified forwarding instructions (block 1530). For example, in an implementation described above in connection with FIG. 5. OFC 220 may provide the second forwarding instructions to network devices 275. The second forwarding instructions may include a MAT that instructs network devices 275 to implement the second service graph. Based on the second forwarding instructions, network devices 275 may forward packet 510 of the application flow to the first feature peer 250-1.

FIG. 16 is a flow chart of an example process 1600 for implementing feature peer network forwarding instructions. In one implementation, process 1600 may be performed by network device 275 and/or a switching function in a hypervisor or a guest operating system. Alternatively, or additionally, some or all of process 1600 may be performed by another device or group of devices, including or excluding network device 275.

As shown in FIG. 16, process 1600 may include receiving and/or storing forwarding instructions based on a service graph that includes an ordered set of feature peers, where the forwarding instructions include instructions to forward packets to the ordered set of feature peers (block 1610), and receiving a packet of an application flow (block 1620). For example, in an implementation described above in connection with FIG. 5, a customer, associated with user device 210, may wish to provide packet 510 of an application flow to destination address device 260. TSA 230 may consult with AAA 240 and/or may inspect packet 510 to determine one or more service graphs 520 for packet 510 of the application flow. TSA 230 may provide service graphs 520 to OFC 220, and OFC 220 may receive and store service graphs 520. A first service graph (SG-1), of service graphs 520, may cause packet 510 to traverse the fourth feature peer 250-4, the third feature peer 250-3, and the second feature peer 250-2 before being provided to destination address device 260. OFC 220 may provide the first forwarding instructions to network devices 275. The first forwarding instructions may include a MAT that instructs network devices 275 to implement the first service graph.

As further shown in FIG. 16, process 1600 may include forwarding the packet to one feature peer of the ordered set of feature peers, a user device, or a destination address device based on the forwarding instructions (block 1630). For example, in an implementation described above in connection with FIG. 5, based on the first forwarding instructions, network devices 275 may forward packet 510 of the application flow to the fourth feature peer 250-4, the third feature peer 250-3, the second feature peer 250-2, and finally to destination address device 260.

FIG. 17 is a flow chart of an example process 1700 for implementing modified feature peer network forwarding instructions. In one implementation, process 1700 may be performed by network device 275. Alternatively, or additionally, some or all of process 1700 may be performed by another device or group of devices, including or excluding network device 275.

As shown in FIG. 17, process 1700 may include receiving and/or storing modified forwarding instructions based on a service graph that includes a particular feature peer, where the modified forwarding instructions include instructions to forward packets to the particular feature peer (block 1710), and receiving a packet of an application flow (block 1720). For example, in an implementation described above in connection with FIG. 5, a customer, associated with user device 210, may wish to provide packet 510 of an application flow to destination address device 260. TSA 230 may consult with AAA 240 and/or may inspect packet 510 to determine one or more service graphs 520 for packet 510 of the application flow. TSA 230 may provide service graphs 520 to OFC 220, and OFC 220 may receive and store service graphs 520. A second service graph (SG-1), of service graphs 520, may cause packet 510 to be provided to the first feature peer 250-1. OFC 220 may provide the second forwarding instructions to network devices 275. The second forwarding instructions may include a MAT that instructs network devices 275 to implement the second service graph.

As further shown in FIG. 17, process 1700 may include forwarding the packet to the particular feature peer based on the modified forwarding instructions (block 1730). For example, in an implementation described above in connection with FIG. 5, based on the second forwarding instructions, network devices 275 may forward packet 510 of the application flow to the first feature peer 250-1.

Systems and/or methods described herein may enable forwarding of packets of an application flow between an ordered set of feature peers (e.g., a service graph) in a more efficient manner than a feature switch (e.g., implemented by a traditional load balancer, access router, and/or traffic steering application) method. The systems and/or methods may determine the service graph of feature peers based on inspection of the packets, and may utilize a protocol to configure network devices of a network with the service graph. The network devices may forward the packets of the application flow to the feature peers, based on the service graph and without changing the application flow. The systems and/or methods may dynamically change the service graph for particular application flows to achieve even greater efficiencies for the particular application flows.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 14-17, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the implementations unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, a service graph of feature peers for an application flow,
     the service graph being generated based on a sample packet of the application flow,
     the feature peers being associated with a network and the service graph identifying an ordered set of the feature peers and forwarding requirements for the ordered set of the feature peers;
   generating, by the device, forwarding instructions for other packets of the application flow, separate from the sample packet, based on the service graph that was generated based on the sample packet of the application flow,
     the forwarding instructions including instructions to forward the other packets of the application flow to the ordered set of the feature peers,
     the forwarding instructions causing the other packets of the application flow to have a shorter path between a user device and the application flow destination than a path for the sample packet between the user device and the application flow destination; and
   providing, by the device, the forwarding instructions to network devices of the network,
     the network devices forwarding the other packets of the application flow to the ordered set of the feature peers based on the forwarding instructions.

2. The method of claim 1, where the other packets and the sample packet of the application flow are forwarded between the user device and a destination address device.

3. The method of claim 1, where the service graph defines a path to the ordered set of the feature peers.

4. The method of claim 1, where each of the feature peers provides one or more of:
content-related services,
security-related services,
quality of service (QoS)-related services,
accounting-related services,
administrative-related services, or
proxy-related services.

5. The method of claim 1, further comprising:
receiving a modified service graph for the application flow,
the modified service graph including a particular feature peer of the feature peers;
generating modified forwarding instructions based on the modified service graph,
the modified forwarding instructions including instructions to forward additional packets of the application flow to the particular feature peer; and
providing the modified forwarding instructions to the network devices,
the network devices forwarding the additional packets of the application flow to the particular feature peer based on the modified forwarding instructions.

6. The method of claim 1, where the forwarding instructions cause the other packets of the application flow to bypass the device, which generates the forwarding instructions, and to bypass a device that generates the service graph based on the sample packet.

7. The method of claim 1, where the forwarding instructions cause the other packets of the application flow to bypass at least one of the device, which generates the forwarding instructions, or a device that generates the service graph based on the sample packet.

8. A device, comprising:
a memory storing one or more instructions; and
one or more processors, which execute the one or more instructions, to:
receive a service graph of feature peers for an application flow,
the service graph being generated based on a first packet of the application flow,
the feature peers being associated with a network and the service graph identifying an ordered set of the feature peers and forwarding requirements for the ordered set of the feature peers,
generate forwarding instructions for other packets of the application flow, separate from the first packet, based on the service graph that was generated based on the first packet of the application flow,
the forwarding instructions including instructions to forward the other packets to the ordered set of the feature peers,
the forwarding instructions causing the other packets of the application flow to have a shorter path between a user device and an application flow destination than a path for the first packet between the user device and the application flow destination; and
provide the forwarding instructions to network devices of the network,
the network devices forwarding the other packets of the application flow to the ordered set of the feature peers based on the forwarding instructions.

9. The device of claim 8, where the other packets and the first packet of the application flow are forwarded between the user device and a destination address device.

10. The device of claim 8, where the service graph defines a path to the ordered set of the feature peers.

11. The device of claim 8, where each of the feature peers provides one or more of:
content-related services,
security-related services,
quality of service (QoS)-related services,
accounting-related services,
administrative-related services, or
proxy-related services.

12. The device of claim 8, where the one or more processors are further to:
receive a modified service graph for the application flow,
the modified service graph including a particular feature peer of the feature peers,
generate modified forwarding instructions based on the modified service graph,
the modified forwarding instructions including instructions to forward additional packets of the application flow to the particular feature peer, and provide the modified forwarding instructions to the network devices,
the network devices forwarding the additional packets of the application flow to the particular feature peer based on the modified forwarding instructions.

13. A method, comprising:
receiving, by a network device, forwarding instructions for an application flow based on a service graph that identifies an ordered set of feature peers,
the service graph being generated based on a sample packet of the application flow,
the feature peers being associated with a network and the forwarding instructions including instructions to forward other packets of the application flow, separate from the sample packet, to the ordered set of feature peers,
receiving, by the network device, the other packets of the application flow; and
forwarding, by the network device, the other packets of the application flow to a user device, a destination address device, or a feature peer, in the ordered set of feature peers, based on the forwarding instructions,
the network device forwarding, based on the forwarding instructions, the other packets of the application flow along a shorter path between the network device and the user device, the destination address device, or the feature peer than the sample packet.

14. The method of claim 13, further comprising:
storing the forwarding instructions in a table of the network device.

15. The method of claim 13, where the service graph defines a path to the ordered set of feature peers.

16. The method of claim 13, the network device being different than the feature peers, and where each of the feature peers provides one or more of:
content-related services,
security-related services,
quality of service (QoS)-related services,
accounting-related services,
administrative-related services, or
proxy-related services.

17. The method of claim 13, further comprising:
receiving modified forwarding instructions based on a modified service graph that includes a particular feature peer of the feature peers, the modified forwarding instructions including instructions to forward the additional packets to the particular feature peer; and forwarding the additional packets of the application flow to the particular feature peer, based on the modified forwarding instructions.

18. A network device, comprising:

a memory storing instructions; and one or more processors, which execute the one or more instructions, to:

receive forwarding instructions for an application flow based on a service graph that includes an ordered set of feature peers, the service graph being generated based on a first packet of the application flow, the feature peers being associated with a network and the forwarding instructions including instructions to forward other packets of the application flow, separate from the first packet, to the ordered set of feature peers, receive the other packets of the application flow, and forward the other packets of the application flow to a user device, a destination address device, or a feature peer, in the ordered set of feature peers, based on the forwarding instructions, the other packets of the application flow being forwarded along a shorter path between the network device and the user device, the destination address device, or the feature peer than the sample packet.

19. The network device of claim 18, where the forwarding instructions include an instruction to change a destination address of the other packets.

20. The network device of claim 18, where the forwarding instructions include an instruction to remove a local area network tag from the other packets.

* * * * *